(12) United States Patent
Aubin-Marchand et al.

(10) Patent No.: US 11,731,715 B2
(45) Date of Patent: Aug. 22, 2023

(54) TRACK ASSEMBLY AND VEHICLE

(71) Applicants:SOUCY INTERNATIONAL INC., Drummondville (CA); BOMBARDIER RECREATIONAL PRODUCTS INC., Valcourt (CA)

(72) Inventors: Jeremie Aubin-Marchand, St-Hugues (CA); Patrick L'Herault, St-Majorique de Grantham (CA); Yan Roger, Drummondville (CA); David Gagnon, Trois-Rivieres (CA); Stephane Pelletier, Drummondville (CA); Raphael Couture, Sherbrooke (CA); Charles Roy, Orford (CA)

(73) Assignees: SOUCY INTERNATIONAL INC., Drummondville (CA); BOMBARDIER RECREATIONAL PRODUCTS INC., Valcourt (CA)

( * ) Notice: Subject to any disclaimer, the term of this patent is extended or adjusted under 35 U.S.C. 154(b) by 580 days.

(21) Appl. No.: 16/277,075

(22) Filed: Feb. 15, 2019

(65) Prior Publication Data
US 2019/0248433 A1 Aug. 15, 2019

Related U.S. Application Data

(60) Provisional application No. 62/630,888, filed on Feb. 15, 2018.

(30) Foreign Application Priority Data

Feb. 15, 2018 (CA) .................................. CA 2995278

(51) Int. Cl.
*B62D 55/125* (2006.01)
*B62D 55/104* (2006.01)
(Continued)

(52) U.S. Cl.
CPC ......... *B62D 55/125* (2013.01); *B62D 55/065* (2013.01); *B62D 55/10* (2013.01);
(Continued)

(58) Field of Classification Search
CPC .... B62D 55/125; B62D 55/065; B62D 55/10; B62D 55/104; B62D 55/14; B62D 55/30; B62D 55/084; B62D 55/0847
(Continued)

(56) References Cited

U.S. PATENT DOCUMENTS 3,241,889 A 3/1966 Mikhailovich et al.
3,872,939 A 3/1975 Eckert
(Continued)

*Primary Examiner* — Anne Marie M Boehler
(74) *Attorney, Agent, or Firm* — BCF LLP

(57) ABSTRACT

A track assembly is to be mounted on a drive axle of a vehicle. The track assembly has a frame, at least one leading idler wheel mounted to the front of the frame for rotation about a transverse leading idler wheel axis, at least one trailing idler wheel mounted to the rear of the frame for rotation about a traverse trailing idler wheel axis parallel to the leading idler wheel axis, and a single drive wheel assembly. The drive wheel assembly includes a sub-frame removably securable to the frame in any one of a plurality of longitudinal securement positions on the frame, and a drive wheel rotationally mounted on the sub-frame for rotation about a drive wheel axis. The drive wheel is operatively connectable to the drive axle of the vehicle. A pair of track assemblies is also described. A vehicle having the pair of track assemblies is also described.

17 Claims, 18 Drawing Sheets

(51) Int. Cl.
  *B62D 55/30* (2006.01)
  *B62D 55/065* (2006.01)
  *B62D 55/10* (2006.01)
  *B62D 55/14* (2006.01)

(52) U.S. Cl.
  CPC .......... *B62D 55/104* (2013.01); *B62D 55/14* (2013.01); *B62D 55/30* (2013.01)

(58) Field of Classification Search
  USPC ............... 180/9.1, 9.21, 9.26, 9.62; 305/153
  See application file for complete search history.

(56) References Cited

U.S. PATENT DOCUMENTS

| | | |
|---|---|---|
| 5,639,148 A | 6/1997 | Sheidler |
| 6,095,275 A * | 8/2000 | Shaw ................... B62K 13/00 |
| | | 180/185 |
| 6,401,847 B1 | 6/2002 | Lykken |
| 6,761,236 B2 | 7/2004 | Hibbert |
| 7,255,184 B2 | 8/2007 | Loegering et al. |
| 7,328,760 B2 * | 2/2008 | Inaoka ............... B62D 49/0635 |
| | | 180/9.21 |
| 7,836,984 B2 | 11/2010 | Watling |
| 7,997,666 B2 | 8/2011 | Bordini |
| 8,240,783 B2 | 8/2012 | Johnson et al. |
| 8,353,372 B2 | 1/2013 | Dorais et al. |
| 2004/0119336 A1 * | 6/2004 | Lussier ................ B62D 55/305 |
| | | 305/145 |
| 2005/0145422 A1 * | 7/2005 | Loegering ............. B62D 55/14 |
| | | 180/9.26 |
| 2006/0207819 A1 * | 9/2006 | Boisvert .............. B62D 55/104 |
| | | 180/190 |

\* cited by examiner

TRACK ASSEMBLY AND VEHICLE

CROSS-REFERENCE

The present application claims priority to U.S. Provisional Patent Application Ser. No. 62/630,888, filed Feb. 15, 2018, entitled "Track Assembly And Vehicle", which is incorporated herein by reference in its entirety.

TECHNICAL FIELD

The present technology relates to track assemblies and vehicles having track assemblies.

BACKGROUND

All-Terrain Vehicles ("ATV's") are four-wheeled off-road vehicles. ATV's are designed for "all" terrains. ATV wheels are usable with "all" terrains, but may not be optimized for one or more particular types of terrain. Given that wheels do not provide optimal traction on certain types of terrain, e.g. mud, snow, sand, etc., track systems were developed to be used on ATV's in place of the wheels. ATV's, however, including their frames, suspensions, and fairings, were designed for having wheels as ground-contacting elements, and not for having tracks.

Track systems have been developed to replace wheels of ATVs, in order to improve traction of the ATVs in some driving conditions. Wheels are circular in shape (and thus when rotated maintain the same shape—and are designed to be rotated in use), and are generally smaller than track systems. Tracks systems typically have frames that are triangular in shape and are generally larger than wheels.

Existing track systems are suitable for their intended purposes. However, improvements to existing systems are always desirable.

SUMMARY

It is an object of the present technology to ameliorate at least some of the inconveniences present in the prior art.

For purposes of this application, terms related to spatial orientation such as forwardly, rearward, upwardly, downwardly, left, and right, are as they would normally be understood by a driver of the vehicle sitting on the driver seat of the vehicle in a normal riding position. Terms related to spatial orientation when describing or referring to components or sub-assemblies of the vehicle and of various components for the vehicle, separately from the vehicle should be understood as they would be understood when these components or sub-assemblies are mounted to the vehicle, unless specified otherwise in this application.

It has been found that improvements to a track assembly may be achieved for at least some driving and terrain conditions by longitudinally repositioning a drive wheel of the track assembly relative to a frame of the track assembly.

In another aspect, it has been found that by providing a track assembly with a drive wheel assembly the longitudinal position of which on the frame of the track assembly is selectively adjustable in some cases makes the track assembly compatible with a relatively larger number of vehicles. In some cases, this results because the drive wheel assembly is selectively repositionable on the frame of the track assembly to clear one or more parts of a vehicle with which the track assembly is to be used, which part(s) would otherwise come into contact with the track assembly during operation of the track assembly.

In another aspect, certain implementations of a track assembly have been conceived that allow the drive wheel of the track assembly to be positioned in at least two different longitudinal securement positions such that in a first one of the at least two different longitudinal securement positions the track system is operable with an endless track having a first length, in a second one of the at least two different longitudinal securement positions the track system is operable with an endless track having a second length, and the first length is equal to the second length. In some cases, this reduces manufacturing costs associated with the track assembly. In some cases, this reduces maintenance costs associated with the track assembly.

According to one aspect of the present technology, there is provided a track assembly to be mounted on a rotatable drive axle of a vehicle. The track assembly includes: a frame having a front, a rear, a bottom, a left side, and a right side; a leading idler wheel assembly including at least one leading idler wheel mounted to the front of the frame for rotation about a transverse leading idler wheel axis; a trailing idler wheel assembly including at least one trailing idler wheel mounted to the rear of the frame for rotation about a traverse trailing idler wheel axis parallel to the leading idler wheel axis; and a single drive wheel assembly. The drive wheel assembly includes: a sub-frame removably securable to the frame in any one of a plurality of longitudinal securement positions on the frame, and a drive wheel rotationally mounted on the sub-frame for rotation about a drive wheel axis and operatively connectable to the drive axle of the vehicle, the drive wheel axis being parallel to the leading idler wheel axis and the trailing idler wheel axis, the drive wheel being in different longitudinal positions relative to the at least one leading idler wheel and the at least one trailing idler wheel when the sub-frame is removably secured to different ones of the longitudinal securement positions. The drive wheel, the at least one leading idler wheel, and the at least one trailing idler wheel together define a track length for a track supportable by the drive wheel, the at least one leading idler wheel, and the at least one trailing idler wheel.

In some implementations, the sub-frame is selectively securable to the frame in any one of the plurality of longitudinal securement positions by being fastened to the frame with a fastener received through the sub-frame in an aperture defined in the frame.

In some implementations, the track assembly further includes a tensioner assembly operable to adjust the track length.

In some implementations, the plurality of the longitudinal securement positions are positioned relative to each other on the frame such that: the track length is a first track length when the sub-frame is removably secured to the frame in a first longitudinal securement position of the plurality of longitudinal securement positions; the track length is a second track length when the sub-frame is removably secured to the frame in a second longitudinal securement position of the plurality of longitudinal securement positions, the second longitudinal securement position being different from the first longitudinal securement position, the second track length being different from the first track length; and the tensioner assembly is operable to adjust the second track length while the sub-frame is in the second longitudinal securement position to make the second track length equal to the first track length.

In some implementations, the tensioner assembly operatively connects at least one of the leading idler wheel assembly and the trailing idler wheel assembly to the frame.

In some implementations, the plurality of the longitudinal securement positions are positioned relative to each other on the frame such that the second track length is within a range of: the first track length minus 0.2 inches; and the first track length plus 0.2 inches.

In some implementations, the plurality of the longitudinal securement positions are positioned relative to each other on the frame such that the second track length is within a range of: the first track length minus 0.1 inches; and the first track length plus 0.1 inches.

In some implementations, the plurality of the longitudinal securement positions are positioned relative to each other on the frame such that the track length is a given track length when the sub-frame is removably secured to the frame in at least two different longitudinal securement positions of the plurality of longitudinal securement positions.

In some implementations, the plurality of the longitudinal securement positions is distributed on the frame along a drive wheel positioning plane; a reference plane is positioned parallel to the drive wheel axis and normal to horizontal flat level ground when the track assembly is in use on the flat level ground; the drive wheel positioning plane has an angle relative to the reference plane; and the angle is defined such that the track length is a given track length when the sub-frame is removably secured to the frame in at least two different longitudinal securement positions of the plurality of longitudinal securement positions.

In some implementations, the plurality of the longitudinal securement positions is distributed on the frame along a curve; and the curve is shaped such that the track length is a given track length when the sub-frame is removably secured to the frame in at least two different longitudinal securement positions of the plurality of longitudinal securement positions on the curve.

In some implementations, the at least two different longitudinal securement positions are two different longitudinal securement positions; the plurality of longitudinal securement positions includes more than the two different longitudinal securement positions; and the rest of the plurality of longitudinal securement positions is positioned between the two different longitudinal securement positions.

In some implementations, the track assembly includes a slot in the frame; the plurality of longitudinal securement positions is defined by the slot; and the sub-frame is removably securable in any one of the plurality of longitudinal securement positions by being fastened to the frame with at least one fastener received through the sub-frame and the slot.

In some implementations, the drive wheel axis is positioned longitudinally asymmetrical in the sub-frame.

In some implementations, the track assembly further includes: a longitudinally-extending left slide rail connected to the bottom of the frame; and a longitudinally-extending right slide rail connected to the bottom of the frame.

In some implementations, the track assembly further includes: a mid-roller mounted for rotation at the bottom of the frame, the mid-roller extending downward past a bottom surface of each of the left slide rail and the right slide rail and rolling on an interior side of the endless track when the endless track is supported around the drive wheel, the at least one leading idler wheel, and the at least one trailing idler wheel, and the track assembly is driven on horizontal flat level ground.

In some implementations, the at least one trailing idler wheel is three trailing idler wheels mounted to the rear of the frame for rotation about the trailing idler wheel axis.

In some implementations, the at least one trailing idler wheel is two trailing idler wheels mounted to the rear of the frame for rotation about the trailing idler wheel axis.

In some implementations, the at least one trailing idler wheel is four trailing idler wheels mounted to the rear of the frame for rotation about the trailing idler wheel axis.

According to one aspect of the present technology, there is provided one of a pair of track assemblies to be mounted on the rotatable drive axle of the vehicle, the pair of track assemblies including: a first track assembly of claim 1 mountable on a left side of the vehicle, the sub-frame of the first track assembly being removably securable to the frame of the second track assembly in any one of the plurality of longitudinal securement positions on the frame of the second track assembly; and a second track assembly of claim 1 mountable to a right side of the vehicle, the sub-frame of the second track assembly being removably securable to the frame of the first track assembly in any one of the plurality of longitudinal securement positions on the frame of the first track assembly; the drive wheel of first track assembly being in a different longitudinal position relative to the at least one leading idler wheel of the second track assembly when the sub-frame of the first track assembly is removably secured to one of the longitudinal securement positions on the frame of the second track assembly than a longitudinal position of the drive wheel of the second track assembly relative to the at least one leading idler wheel of the second track assembly when the sub-frame of the second track assembly is removably secured to the one of the longitudinal securement positions on the frame of the second track assembly.

According to one aspect of the present technology, there is provided the pair of track assemblies.

According to one aspect of the present technology, there is provided a vehicle having the pair of track assemblies, the pair of track assemblies being mounted to rear drive axles of the vehicle.

In some implementations, the vehicle is an all-terrain vehicle.

In some implementations, the vehicle is a side-by-side vehicle.

In some implementations, the vehicle is a motorized wheelchair.

The foregoing examples are non-limiting.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
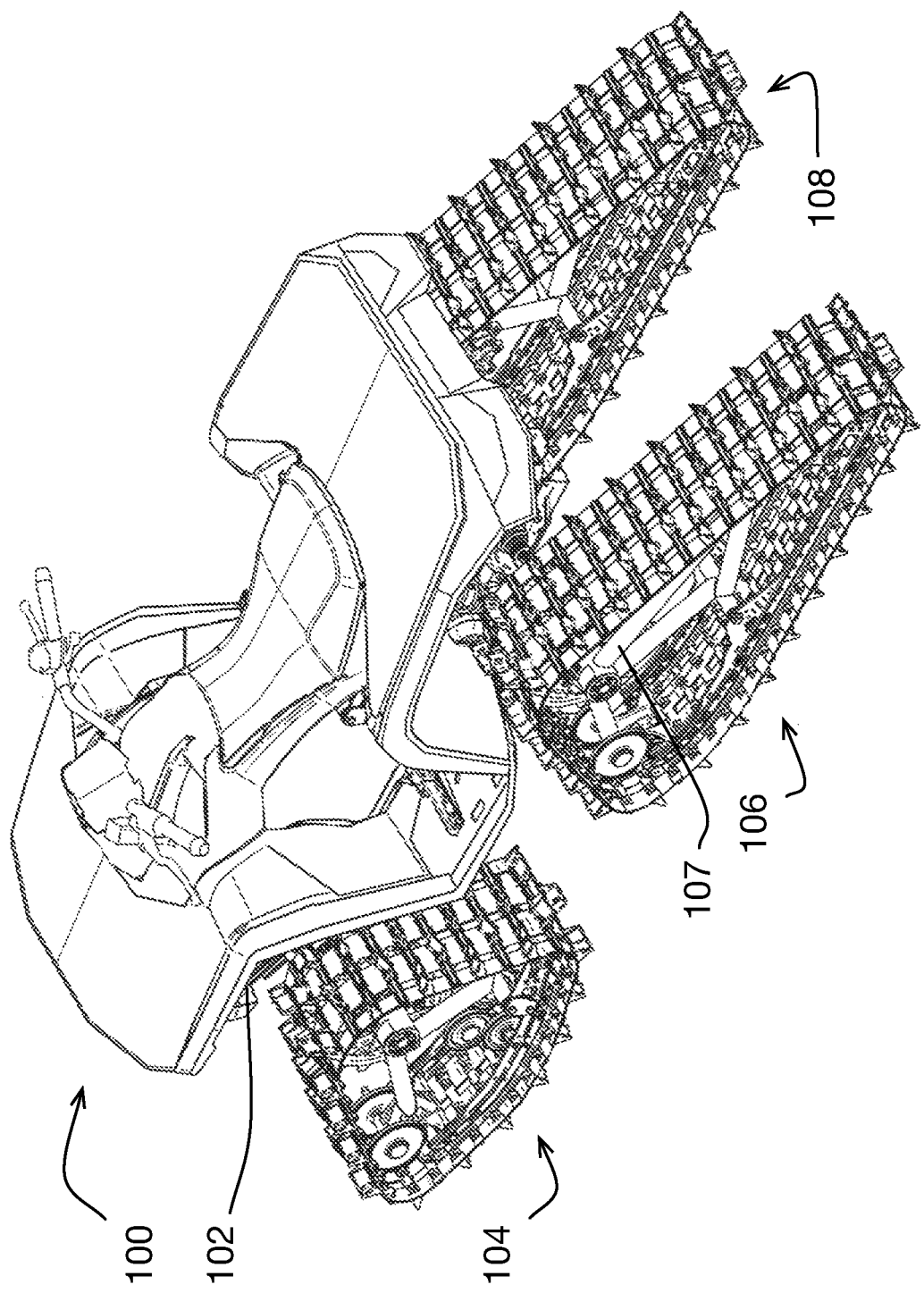
FIG. 1 is a perspective view of a rear left top side of an all-terrain vehicle, the vehicle having a rear left track assembly and a rear right track assembly, according to one implementation.
Figure 2:
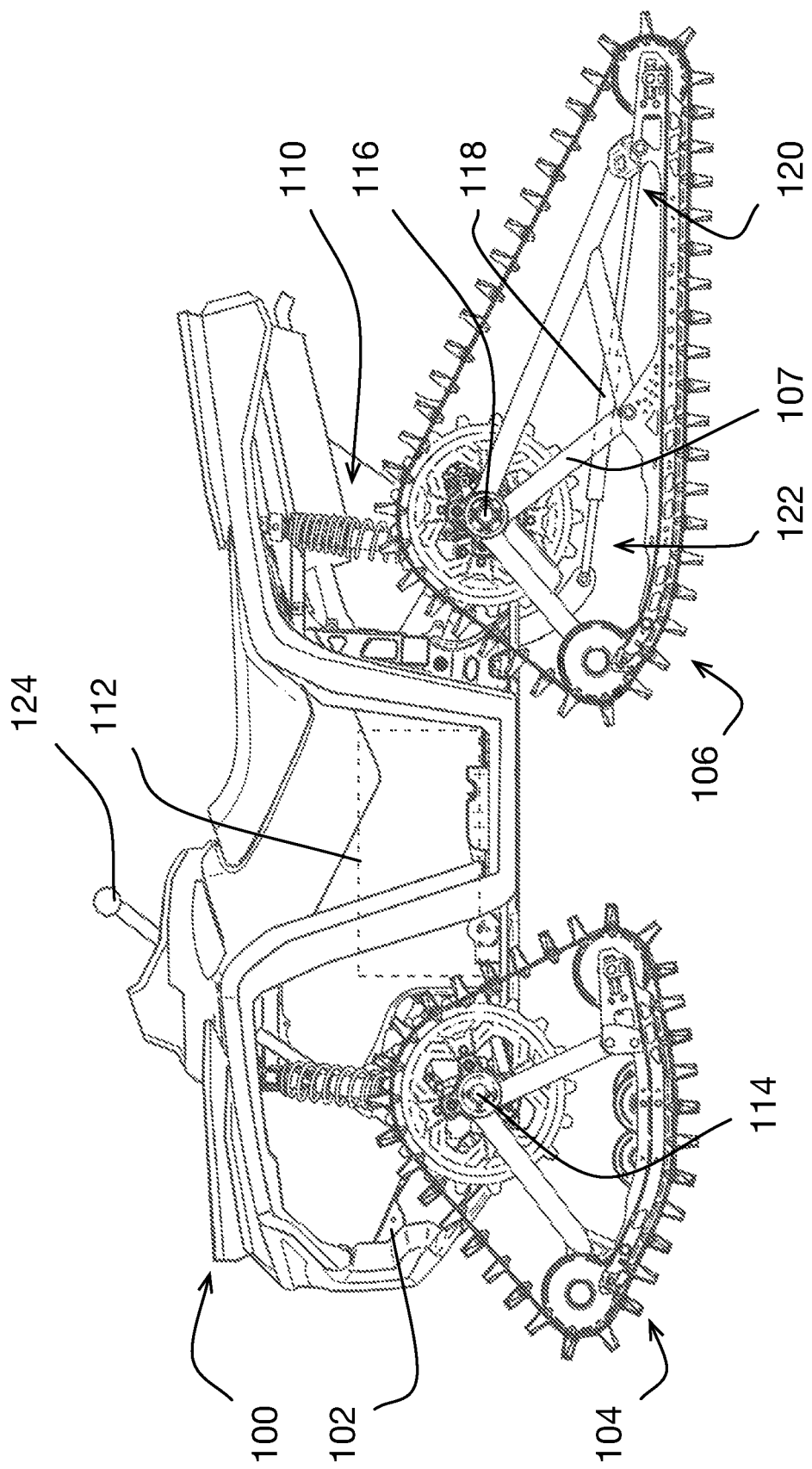
FIG. 2 is a left side elevation view of the all-terrain vehicle of FIG. 1.

The present technology is described with regard to its use with an All-Terrain Vehicle ("ATV") 100, shown in FIGS. 1 and 2. The ATV 100 is an example of a vehicle with which the present technology could be used. It is contemplated that the present technology could be used with other vehicles, including a side-by-side vehicle and a motorized wheelchair.

As shown, the ATV 100 has a chassis 102. The chassis 102 supports a front left track assembly 104, a front right track assembly 105 (FIG. 18), a rear left track assembly 106 and a rear right track assembly 108 via a suspension system 110 (FIG. 2). The front right track assembly is a mirror image of the front left track assembly 104. The rear right track assembly 108 is a mirror image of the rear left track assembly 106.

Figure 18:
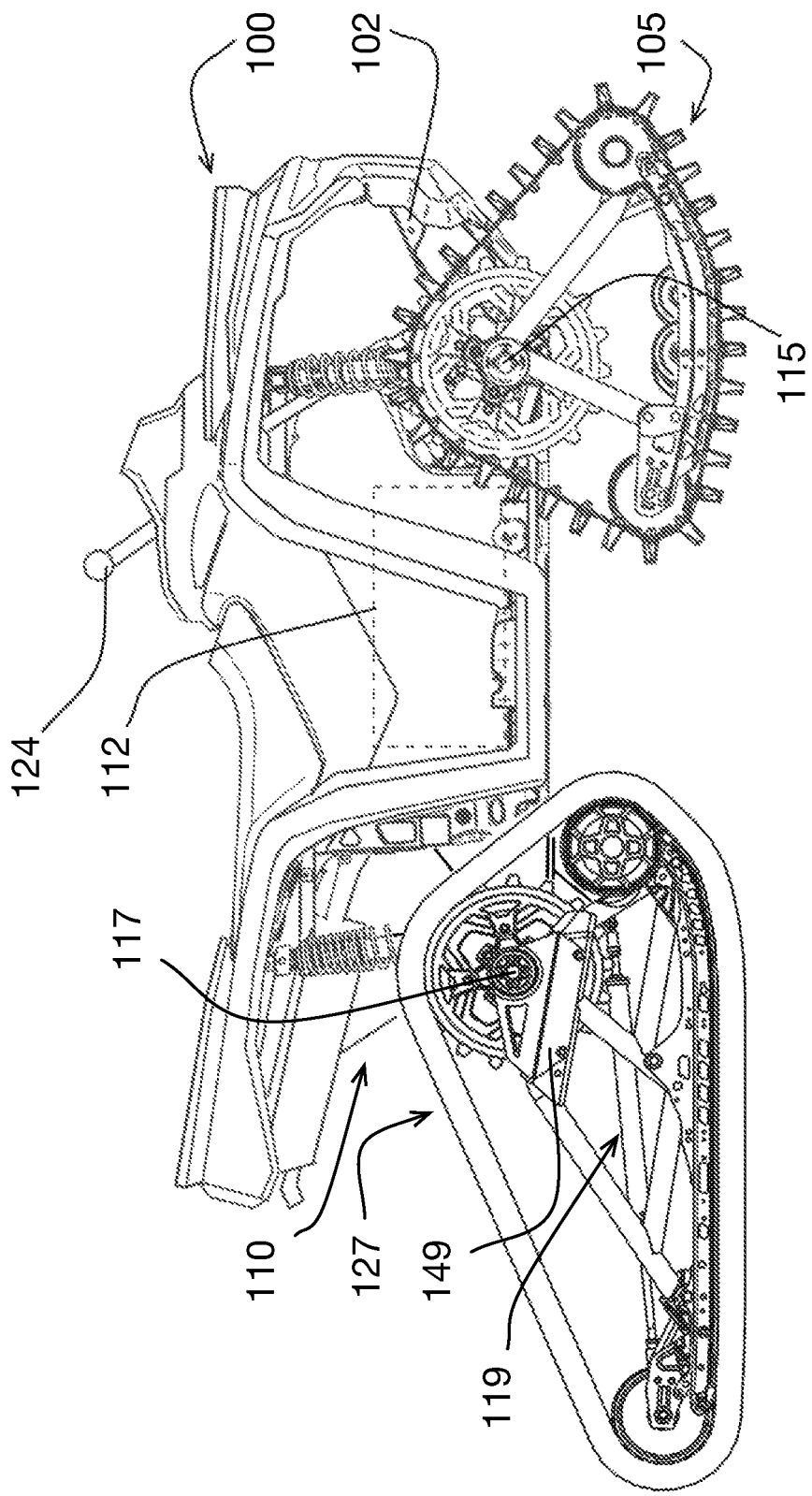
FIG. 18 is a right side elevation view of the all-terrain vehicle of FIG. 1, with the rear right track assembly having been replaced with the rear right track assembly of FIG. 4, with the mid-rollers of the rear right track assembly removed.

As shown in FIG. 2, the ATV 100 has an engine 112 supported by the vehicle chassis 102 for providing motive power to propel the ATV 100. To this end, the ATV 100 has a front left drive axle 114, a front right drive axle 115 (FIG. 18), a rear left drive axle 116, and a rear right drive axle 117 (FIG. 18). All four of the drive axles 114, 115, 116, 117 are operatively connected to the engine 112 via a transmission (not shown), to be selectively driven by the engine 112 to drive the track assemblies 104, 105, 106, 108 of the ATV 100 to propel the ATV 100. In the present implementation, the front right drive axle 115 is a mirror image of the front left drive axle 114 and the rear right drive axle 117 is a mirror image of the rear left drive axle 116.

Each of the two front track assemblies 104, 105 is connected to the chassis 102, and in some implementations instead to the lower a-arms of the front suspension portion of the suspension system 110, via a conventionally known rotation limiting device (not shown) which limits pivoting of the respective one of the two front track assemblies 104, 105 about the corresponding one of the front drive axles 114, 115. In the present implementation, the ATV 100 further includes handlebars 124 and a steering system (not shown) that operatively connects the handlebars 124 to the two front track assemblies 104, 105 to pivot the front track assemblies 104, 105 by pivoting the handlebars 124 and to thereby steer the ATV 100.

As shown in FIG. 2, in the present implementation, the rear left track assembly 106 is connected to the chassis 102 of the ATV 100 via a dynamic traction device 118. In the present implementation, the dynamic traction device 118 is connected at one end 120 to a rear portion of a frame 107 of the rear left track assembly 106 and at the other end 122 to the chassis 102. In one aspect, the dynamic traction device 118 controls pivoting of the rear left track assembly 106 about the drive axle 116 when the ATV 100 is in use. The dynamic traction device 118 and the rear left track assembly 106 are described in more detail in commonly owned U.S. patent application Ser. No. 15/485,699, filed Apr. 12, 2017, entitled "Track System for Attachment to a Vehicle", which application is hereby incorporated herein in its entirety.

In the present implementation, the rear right track assembly 108 is connected to the chassis 102 via a dynamic traction device 119 (FIG. 18) that is a mirror image of the dynamic traction device 118, in the same way as the rear left track assembly 106 is connected to the chassis 102 via the dynamic traction device 118. Therefore, the dynamic traction device 119 is not described herein in detail. It is contemplated that the rear track assemblies 106, 108 could be connected to the chassis 102 via suitable rotation limiting devices, instead of the dynamic traction devices 118, 119.

As described in the U.S. patent application Ser. No. 15/485,699, the rear track assemblies 106, 108 are suitable for their intended purposes and provide certain aspects of performance in some driving conditions.

Other Implementations of the Rear Track Assemblies

Figure 3:
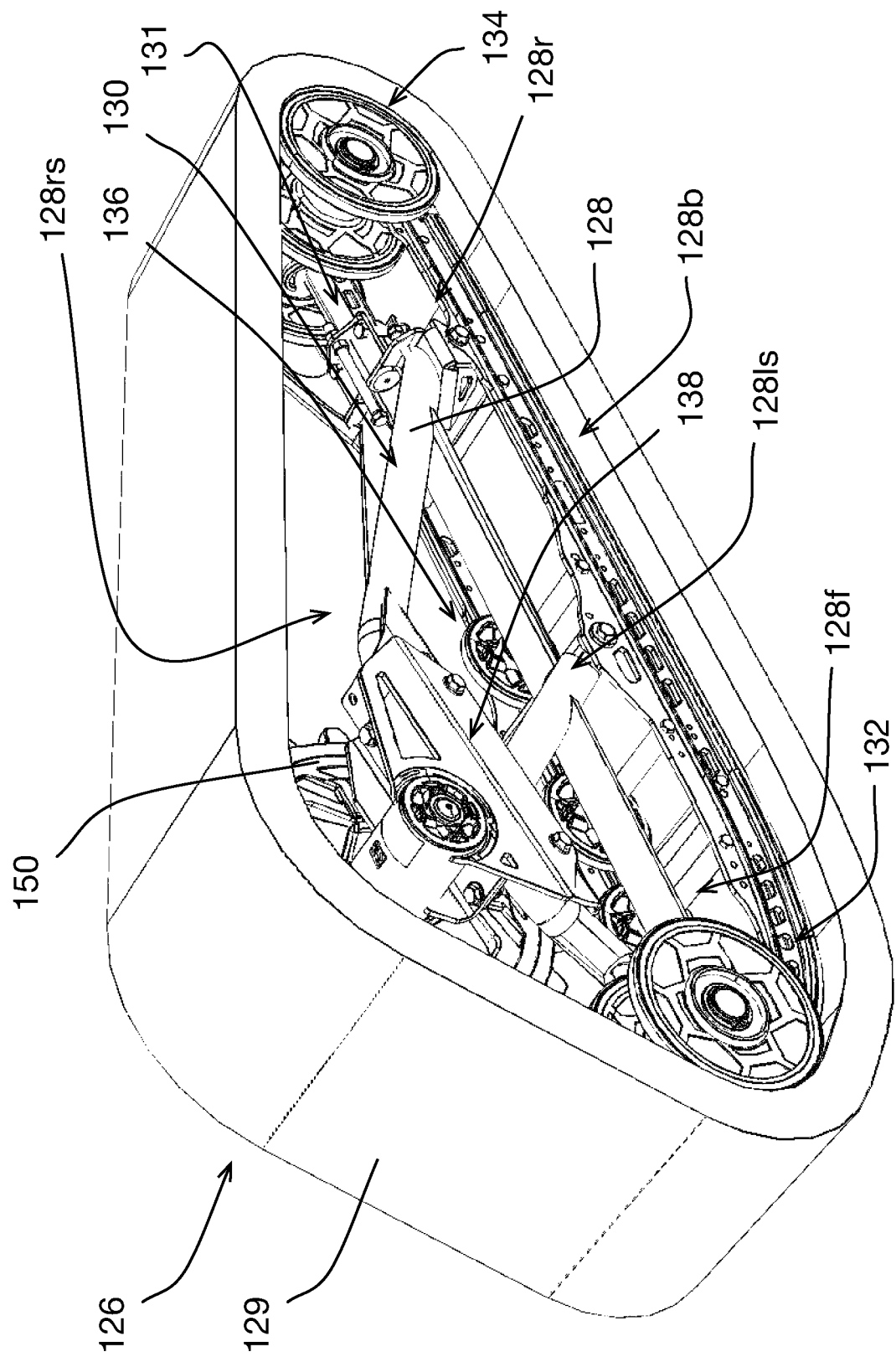
FIG. 3 is a perspective view of a front left top side of the rear left track assembly of the all-terrain vehicle of FIG. 1, according to another implementation of the rear left track assembly.
Figure 4:
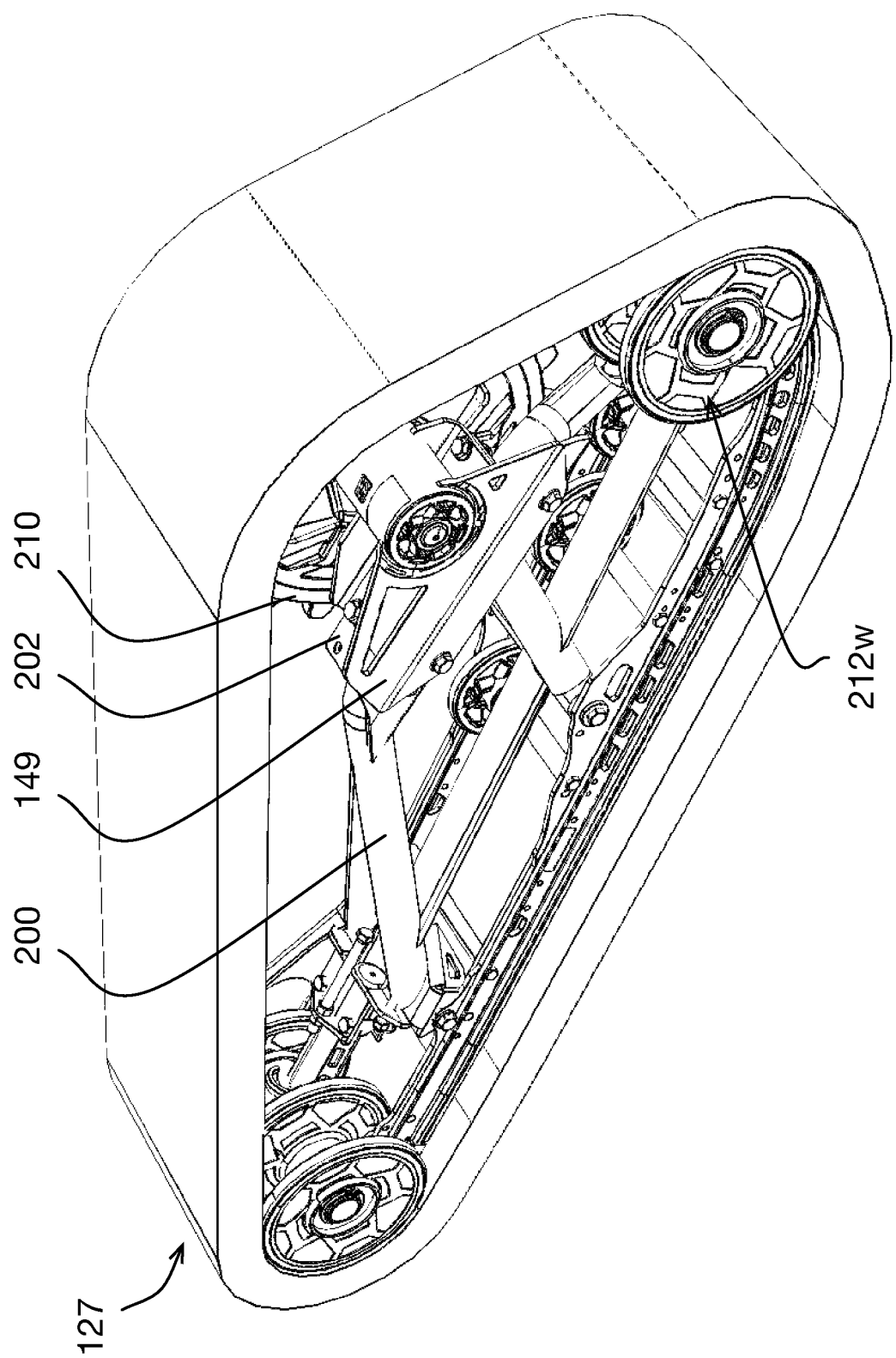
FIG. 4 is a perspective view of a front right top side of the rear right track assembly of the all-terrain vehicle of FIG. 1, according to another implementation of the rear left track assembly.

FIG. 3 shows a rear left track assembly 126, which is a different implementation of the rear left track assembly 106, and could be used instead of the rear left track assembly 106 on the ATV 100. FIG. 4 shows a rear right track assembly 127, which is a different implementation of the rear right track assembly 108, and could be used instead of the rear right track assembly 108 on the ATV 100. The track assembly 127 is a mirror image of the track assembly 126. Therefore, only the track assembly 126 is described herein in detail.

Figure 5:
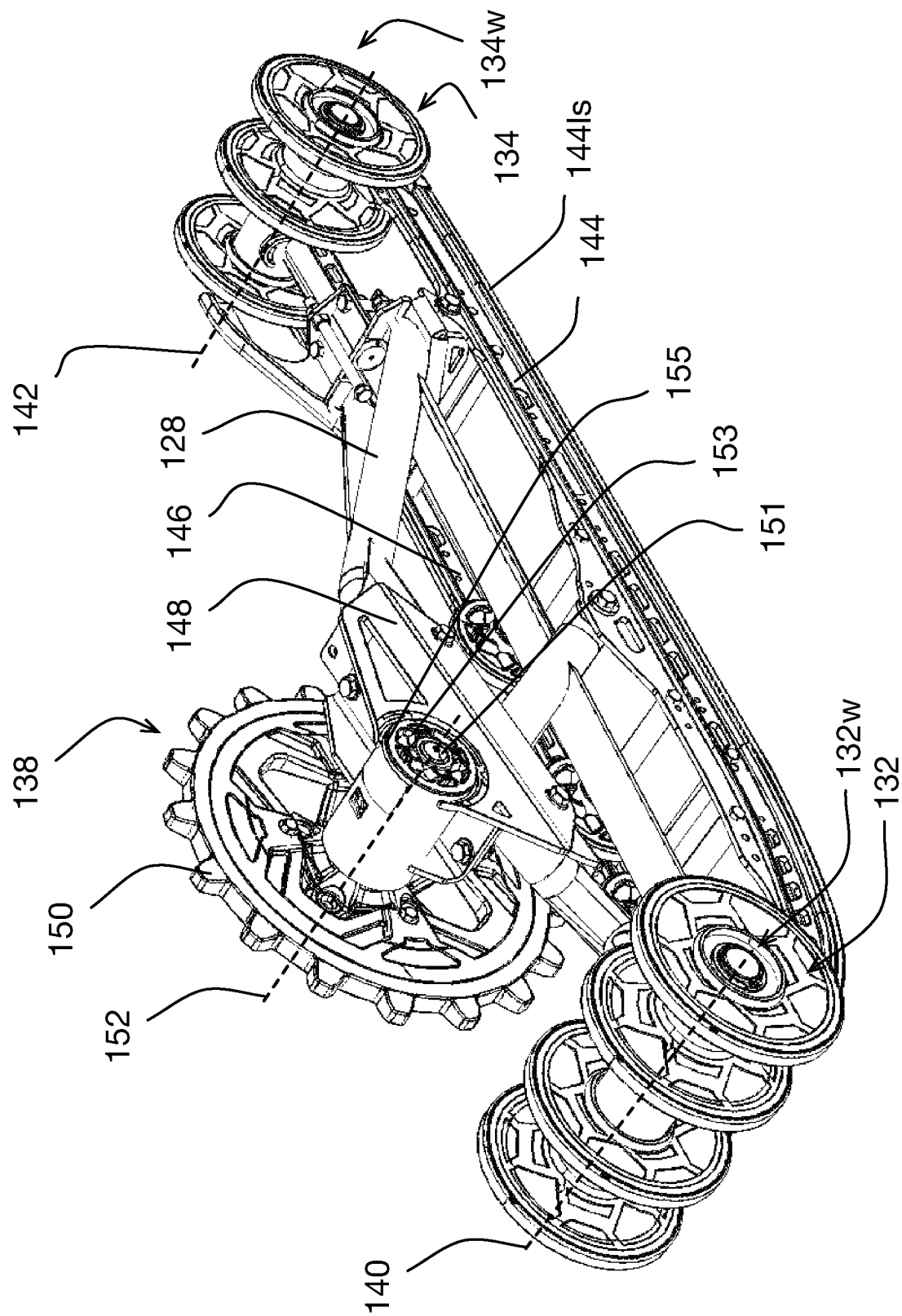
FIG. 5 is a perspective view of a front left top side of the rear left track assembly of FIG. 3, with an endless track of the rear left track assembly removed for clarity.

Referring to FIGS. 3 and 5, the track assembly 126 has a frame 128. The frame 128 includes a plurality of steel frame members 130, a longitudinally-extending left slide rail 144, and a longitudinally-extending right slide rail 146. The frame 128 has a front 128*f*, a rear 128*r*, a bottom 128*b*, a left side 128*ls*, and a right side 128*rs*. The longitudinally-extending left slide rail 144 is connected to the frame members 130 and is positioned at the bottom 128*b* of the frame 128 on the left side 128*ls* of the frame 128. The longitudinally-extending right slide rail 146 is connected to the frame members 130 and is positioned at the bottom 128*b* of the frame 128 on the right side 128*rs* of the frame 128.

In the present implementation, the frame members 130 are welded to each other and are thus non-mobile relative to each other. It is contemplated that the frame members 130 could be made of other suitable materials and could be interconnected by connections that are different from welded connections. In the present implementation, the frame 128 is suspensionless. It is contemplated that the frame 128 could include a suspension, such that, for example an upper part of the frame 128 would be sprung relative to a lower part of the frame 128 (not shown).

In the present implementation, the track assembly 126 includes a leading idler wheel assembly 132, a trailing idler wheel assembly 134, three mid-rollers 136, and a single drive wheel assembly 138.

As best shown in FIG. 5, the leading idler wheel assembly 132 has four leading idler wheels 132*w* that are mounted to the front 128*f* of the frame 128 for rotation about a transverse leading idler wheel axis 140. In some cases, the four-wheeled implementation of the leading idler wheel assembly 132 provides for reduced wear of an endless track 129 (shown schematically in the Figures) used with the track assembly 126. In other implementations, the leading idler wheel assembly 132 has different numbers of leading idler wheels 132*w*. In one particular implementation, the leading idler wheel assembly 132 has two leading idler wheels 132*w*.

In the present implementation, the trailing idler wheel assembly 134 has three trailing idler wheels 134*w* mounted to the rear 128*r* of the frame 128 via a tensioner assembly 131, for rotation about a traverse trailing idler wheel axis 142. In some cases, the three-wheeled implementation of the trailing idler wheel assembly 134 provides for reduced wear of the endless track 129 used with the track assembly 126. In other implementations, the trailing idler wheel assembly 134 has different numbers of trailing idler wheels 134*w*.

In the present implementation, the trailing idler wheel axis 142 is parallel to the leading idler wheel axis 140. In the present implementation, the tensioner assembly 131 is operable to selectively move the trailing idler wheels 134*w* forward and rearward to adjust tension in an endless track 129 that is to be used with the track assembly 126. It is contemplated that the tensioner assembly 131 could be any suitable tensioner assembly. It is also contemplated that, instead of or in addition to the trailing idler wheel assembly 131, the leading idler wheel assembly 132 could be implemented with a suitable tensioner assembly such that leading idler wheel assembly 132 would be used to adjust tension in the endless track 129.

In the present implementation, the endless track 129 is made using conventionally known materials and construction. It is contemplated that the endless track 129 could be any suitable endless track.

In the present implementation, the front ends of the slide rails 144, 146 are curved to define a travel path for the endless track 129. The bottom surface of each of the two slide rails 144, 146 is positioned such that it is supportable by the endless track 129 against terrain.

Figure 6:
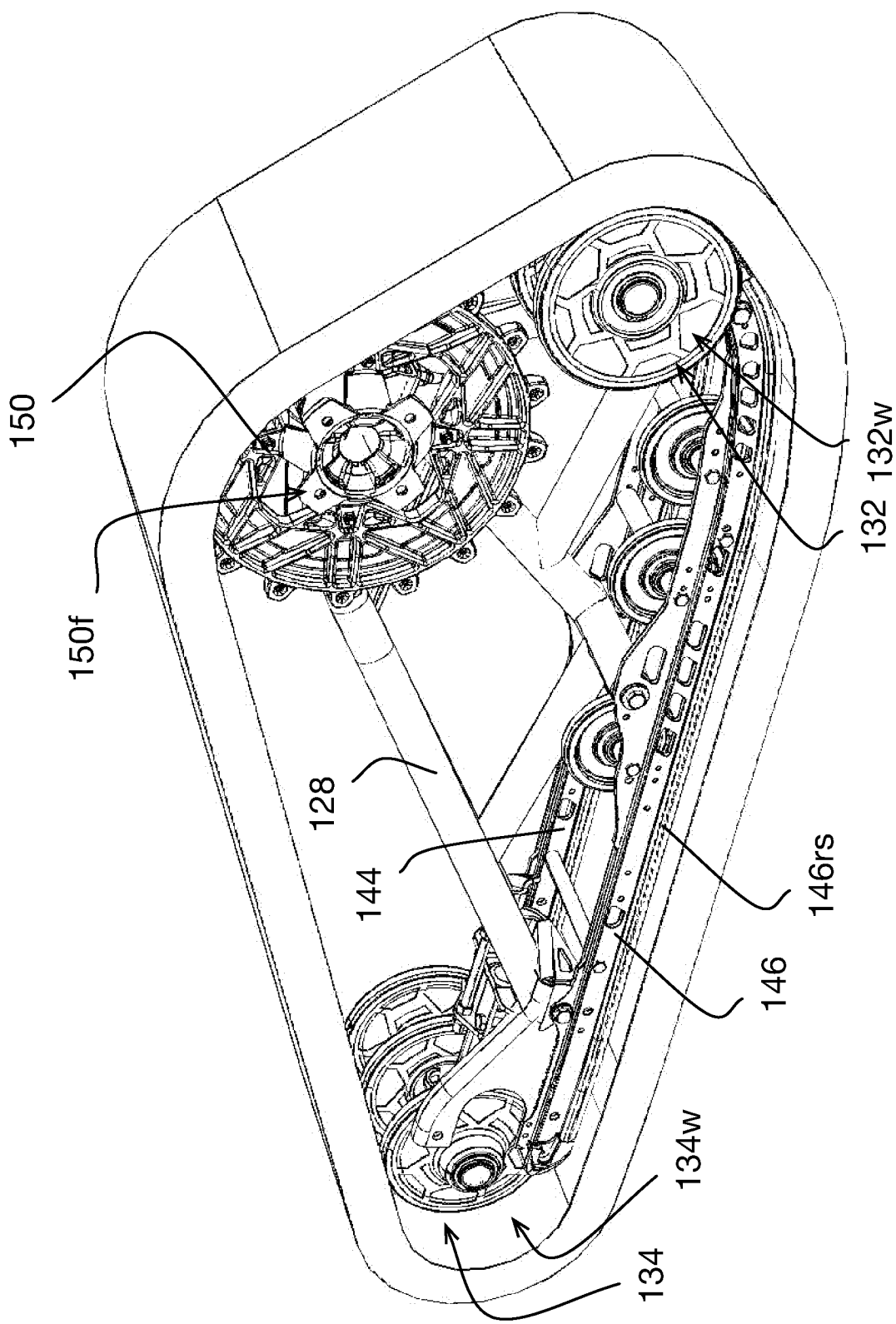
FIG. 6 is a perspective view of a front right top side of the rear left track assembly of FIG. 3.

In this implementation, the bottom surface of each of the slide rails 144, 146 is provided by a slide made of an ultra high molecular weight ("UHMW") polymer. FIG. 5 shows the slide 144*ls* of the slide rail 144. FIG. 6 shows the slide 146*rs* of the slide rail 146.

In the present implementation, each of the slides 144*ls*, 146*rs* is held on its corresponding slide rail 144, 146 by a conventionally known combination of T-slot and a screw. It is contemplated that the slides 144*ls*, 146*rs* could be secured using a different suitable mechanism, including an adhesive. It is contemplated that the slides 144*ls*, 146*rs* could be integral with corresponding ones of the slide rails 144, 146. In some implementations, instead of having the slides 144*ls*, 146*rs*, the bottom surfaces of the slide rails 144, 146 are coated a low-friction material such as a UHMW polymer.

In the present implementation, the three mid-rollers 136 of the track assembly 126 are rotationally mounted to the slide rails 144, 146, and therefore to the frame 128, via corresponding shafts and extend downward past the bottom surfaces of the slide rails 144, 146 to roll on an interior side of the endless track 129 when the track assembly 126 is in use. The mid-rollers 136 thereby support the endless track 129, as best shown in FIG. 3, against terrain. In other implementations, different numbers of mid-rollers 136 are used. For example, in some implementations, the track assembly 126 has a single mid-roller. As another example, in some implementations, the track assembly 126 has no mid-rollers. In the present implementation, the mid-rollers 136 are positioned proximate the slide rail 146. In some implementations of the track assembly 126 which include one or more mid-rollers, at least one of the mid-roller(s) is/are positioned proximate the slide rail 144.

Referring to FIG. 5, the drive wheel assembly 138 includes a sub-frame 148 and a drive wheel 150 that is rotationally mounted to the sub-frame 148 for rotation about a drive wheel axis 152. In some implementations, the drive wheel assembly 138 has more than one drive wheel mounted to the sub-frame 148 for rotation about the drive wheel axis 152, for driving the endless track 129.

In the present implementation, the drive wheel 150 is a drive sprocket that has a central shaft 151 and is rotationally mounted to the sub-frame 148 via a plurality of conventionally known ball bearings 153 press-fitted over the central shaft 151 and into a transverse aperture 155 defined in the sub-frame 148. It is contemplated that any other suitable rotational mounting mechanism could be used.

In the present implementation, and as best shown in FIG. 6, the drive wheel 150 is connectable to the rear left drive axle 116 of the ATV 100. More particularly, in the present implementation, the drive wheel 150 has four flanges 150*f* (FIG. 6) positioned radially about the drive wheel axis 152 of the drive wheel 150. As shown in FIG. 6, each of the four flanges 150*f* has an aperture defined therein, which aperture is sized to receive a bolt. The apertures in the flanges 150*f* are arranged to match the bolt pattern of the rear left wheel hub (not shown) of the ATV 100, to which rear left wheel hub the rear left drive axle 116 is connected and which rear left wheel hub is original equipment that the ATV 100 was manufactured with.

Therefore, in the present implementation, the drive wheel 150 is connectable to the rear left drive axle 116 of the ATV 100 by being fitted onto the rear left wheel hub and by being fastened to the rear left wheel hub by four bolts received through corresponding ones of the four apertures in the flanges 150f and in corresponding ones of four threaded apertures defined in the rear left wheel hub. It is contemplated that the drive wheel 150 could have any other number of flanges 150f and apertures defined in the flanges 150f, to suit at least one bolt pattern of at least one wheel hub of a vehicle. It is contemplated that the drive wheel 150 could have any other suitable mounting mechanism to be connected to a drive axle of a vehicle.

Figure 7:
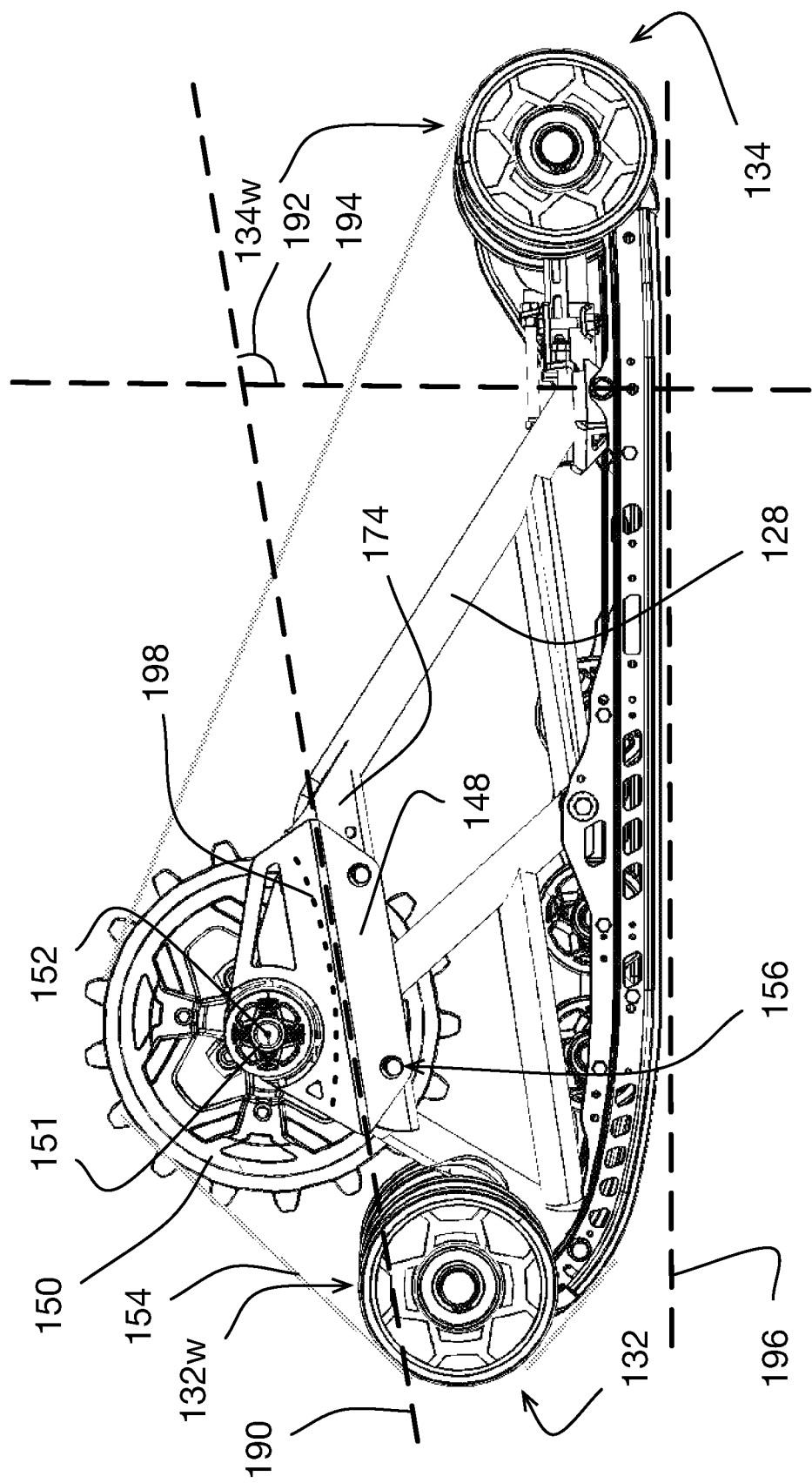
FIG. 7 is a left side elevation view of the rear left track assembly of FIG. 3, with a sub-frame of the rear left track assembly being in a first longitudinal securement position.

In the present implementation, and as best shown in FIG. 7, the leading idler wheels 132w, the trailing idler wheels 134w and the drive wheel 150 together define a track length 154 for the endless track 129 that is supportable by the leading idler wheels 132w, the trailing idler wheels 134w and the drive wheel 150. The track length 154 is a length of the endless track 129, measured along an inner side of the endless track 129.

Referring back to FIG. 3, when the track assembly 126 is in use, the endless track 129 is mounted around the leading idler wheels 132w, the trailing idler wheels 134w and the drive wheel 150 and is suitably tensioned by adjustment of the tensioner assembly 131 via a conventionally known tensioning method. As shown, the endless track 129 is in driving engagement with the drive wheel 150. To this end, the endless track 129 includes conventionally known longitudinally distributed apertures (not shown) defined therein. Teeth of the drive wheel 150 are received in corresponding ones of the apertures in the endless track 129 as the endless track 129 is driven by the drive sprocket. It is contemplated that a different type of endless track 129 could be used to suit each particular implementation of the drive wheel 150. For example, it is contemplated that a friction drive wheel and a corresponding friction drive endless track could be used.

Figure 8:
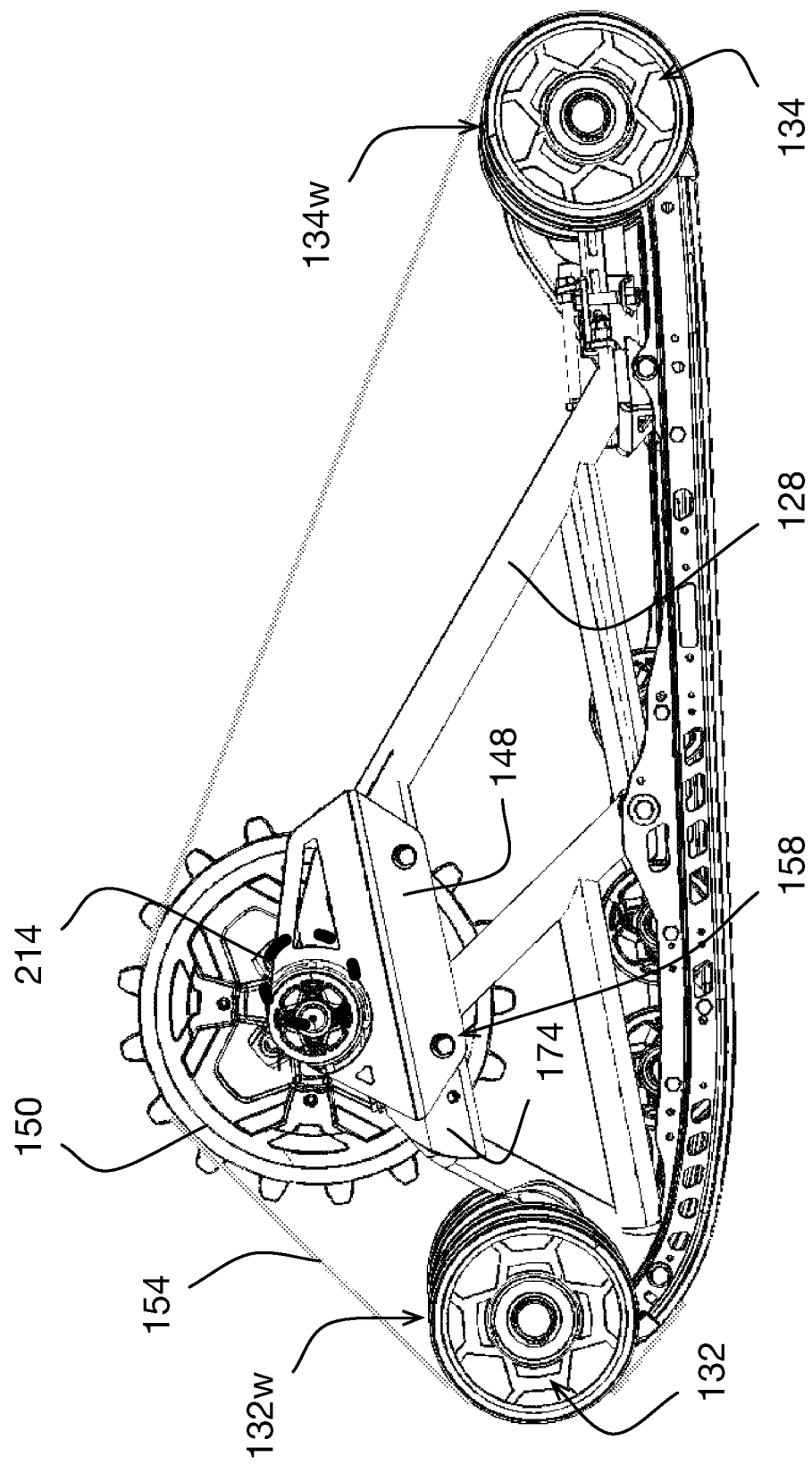
FIG. 8 is a left side elevation view of the rear left track assembly of FIG. 7, with the sub-frame of the rear left track assembly being in a second longitudinal securement position.

In the present implementation, the sub-frame 148 of the track assembly 126 is removably securable to the frame 128 of the track assembly 126 in two different longitudinal securement positions 156, 158 on the frame 128. A first longitudinal securement position 156 of the two different longitudinal securement positions 156, 158 is shown in FIG. 7. A second longitudinal securement position 158 of the two different longitudinal securement positions 156, 158 is shown in FIG. 8. In the present implementation, the sub-frame 148 is closer to the trailing idler wheels 134w when the sub-frame 148 is in the second longitudinal securement position 158 (FIG. 8) than when the sub-frame 148 is in the first longitudinal securement position 156 (FIG. 7).

Figure 9:
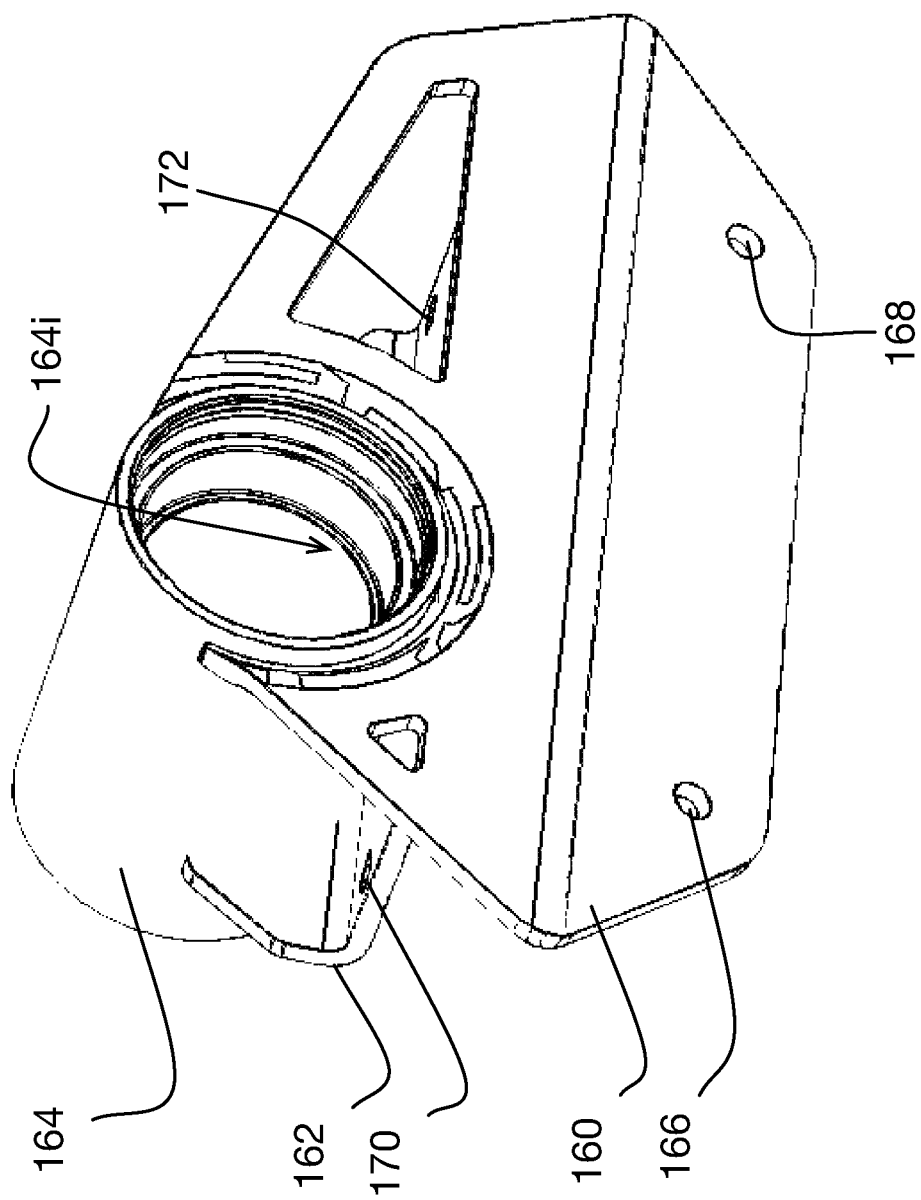
FIG. 9 is a perspective view of a front top left side of the sub-frame of the rear left track assembly of FIGS. 7 and 8, with some parts of the sub-frame removed for clarity.
Figure 10:
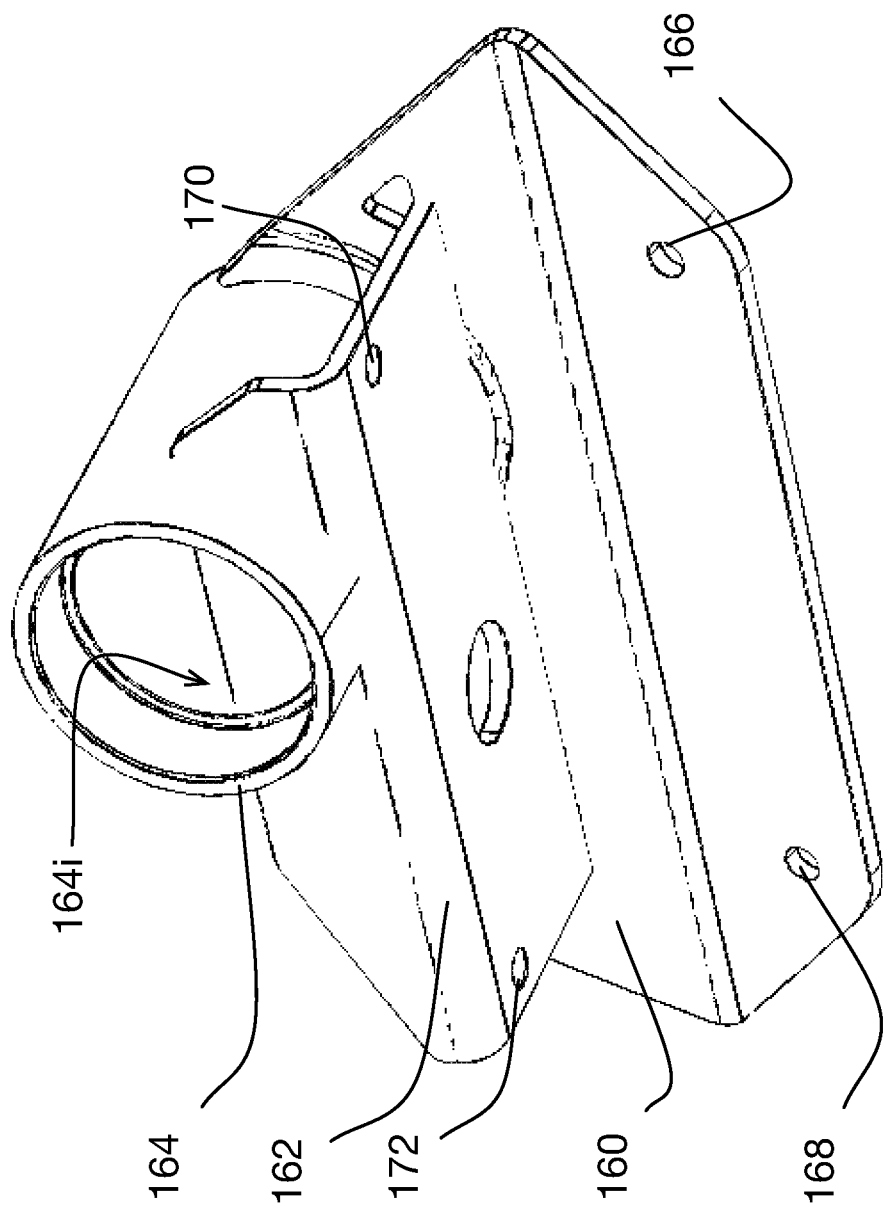
FIG. 10 is a perspective view of a front bottom right side of the sub-frame of FIG. 9, with some parts of the sub-frame removed for clarity.

In the present implementation, and as best shown in FIGS. 9 and 10, the two different longitudinal securement positions 156, 158 are provided as follows. As best shown in these figures, the sub-frame 148 is a stamped steel bracket that has a generally vertical flange 160, a generally horizontal flange 162 welded to the generally vertical flange 160, and a tubular member 164 welded to the generally vertical flange 160 and the generally horizontal flange 162. The tubular member 164 is orthogonal to the generally vertical flange 160 and is shaped on its inner surface 164i to removably receive the ball bearings 153 and the central shaft 151 of the drive wheel 150 therein via press-fit.

Two bolt-receiving apertures 166, 168 are defined in the generally vertical flange 160. Similarly, another two bolt-receiving apertures 170, 172 are defined in the generally horizontal flange 162. Each of the apertures 166, 168, 170, 172 is sized to receive a bolt therein for removably securing the sub-frame 148 to the frame 128 of the track assembly 126 in any one of the first longitudinal securement position 156 and the second longitudinal securement position 158.

Figure 11:
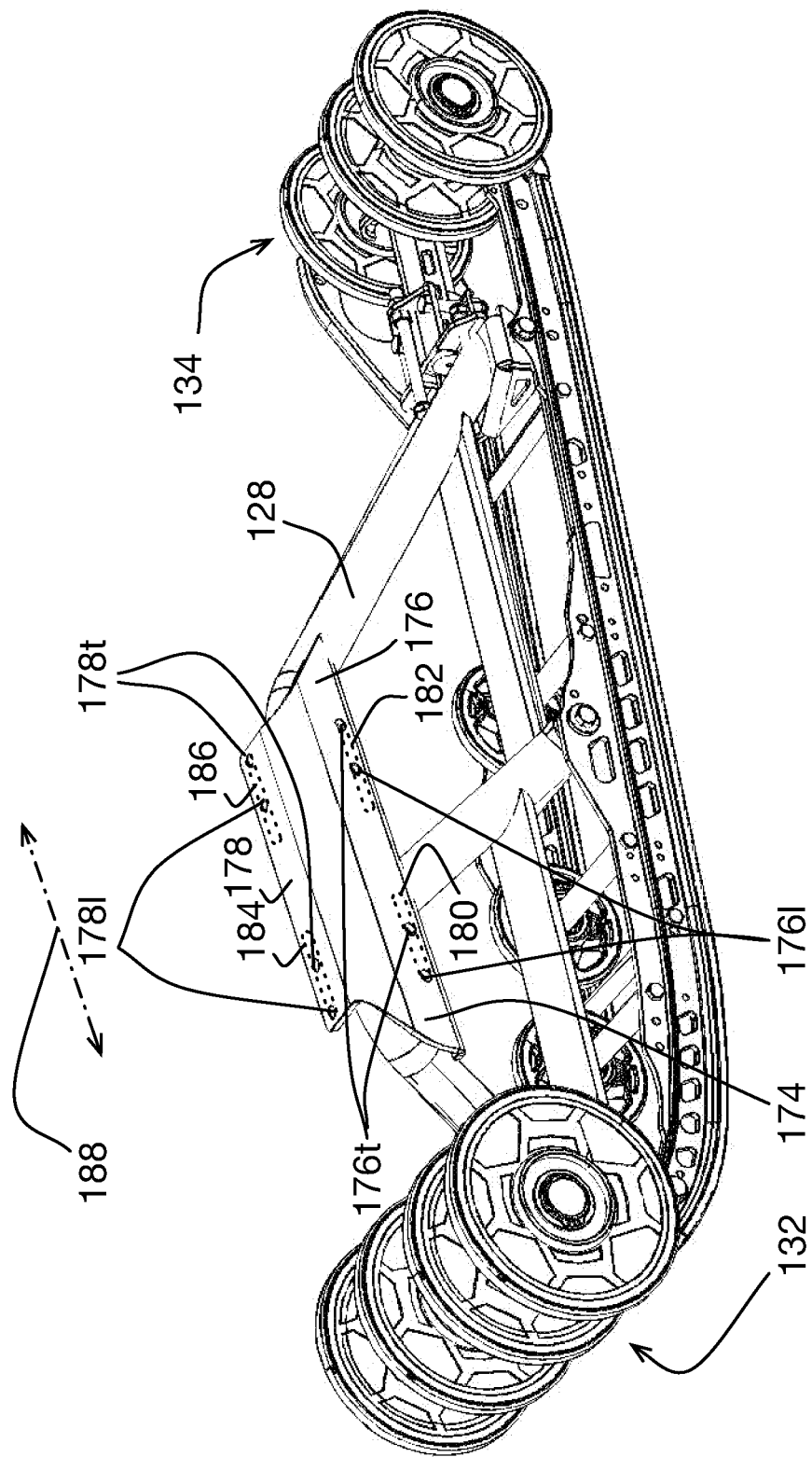
FIG. 11 is a perspective view of a front left top side of the rear left track assembly of FIG. 3, with some parts of the rear left track assembly removed for clarity.
Figure 12:
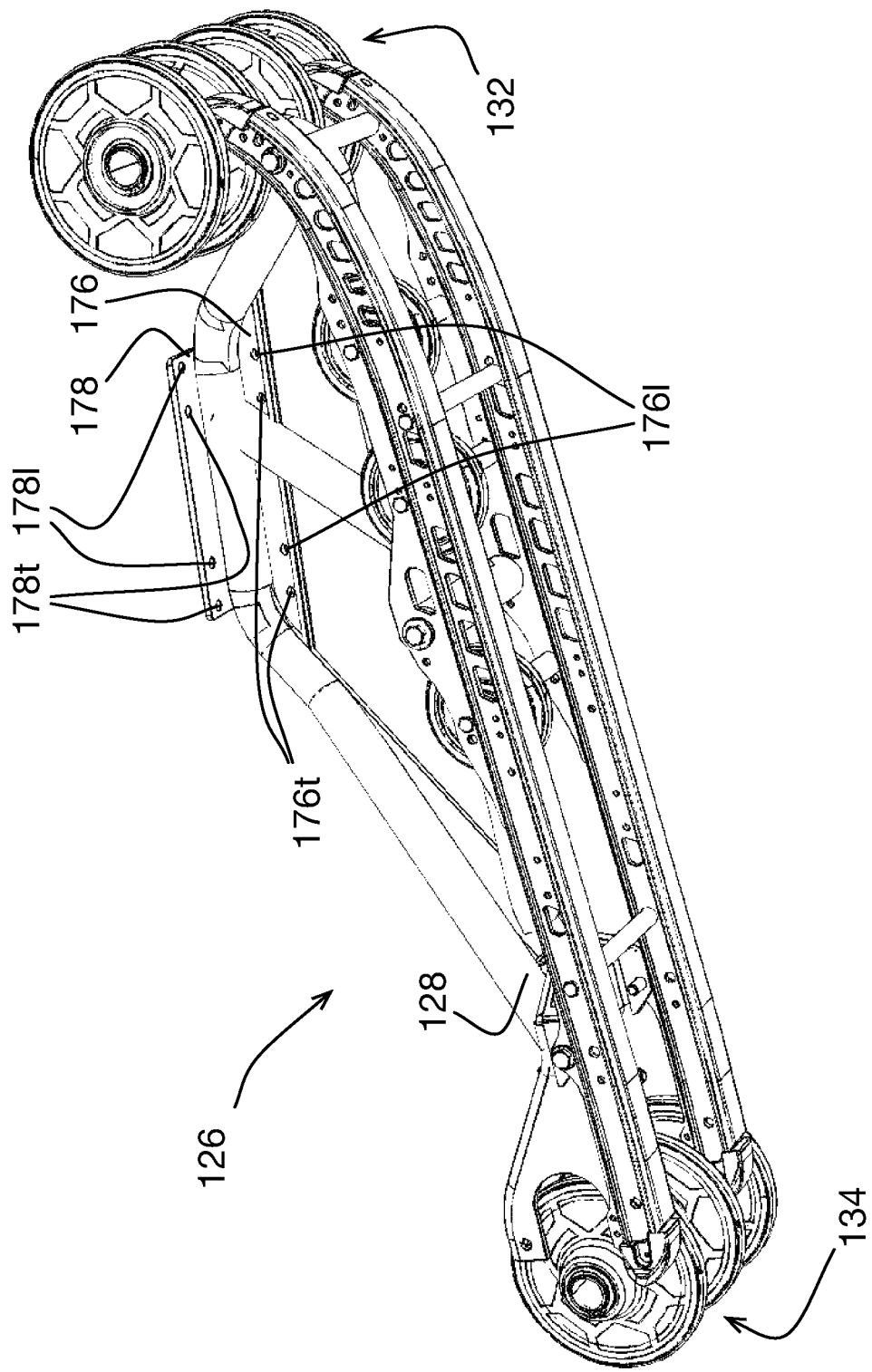
FIG. 12 is a perspective view of a front right bottom side of the rear left track assembly of FIG. 11, with some parts of the rear left track assembly removed for clarity.

To this end, and as best shown in FIGS. 11 and 12, the frame 128 includes a mounting portion 174 that is welded to the frame members 130. It is contemplated that the mounting portion 174 could be attached to the frame members 130 via any other suitable mechanism, including being made integral with one, some, or all of the frame members 130.

In the present implementation, the mounting portion 174 includes a generally vertical flange 176 for receiving the generally vertical flange 160 of the sub-frame 148 thereon, and a generally horizontal flange 178 for receiving the generally horizontal flange 162 of the sub-frame 148 thereon. As best shown in FIG. 5, the generally vertical flanges 160, 176 and the generally horizontal flanges 162, 178 are dimensioned and shaped relative to each other such that when the sub-frame 148 is removably secured to the mounting portion 174, the generally vertical flange 160 contacts the generally vertical flange 176 and the generally horizontal flange 162 contacts the generally horizontal flange 178. In the present implementation, the generally vertical flanges 160, 176 and the generally horizontal flanges 162, 178 are dimensioned and shaped relative to each other also such that the sub-frame 148 is slidable on the mounting portion 174 when not secured to the mounting portion 174.

In the present implementation, the generally vertical flange 176 of the mounting portion 174 has a leading pair of bolt-receiving apertures 176l and a trailing pair of bolt-receiving apertures 176t defined therein. Similarly, the generally horizontal flange 178 of the mounting portion 174 has a leading pair of bolt-receiving apertures 178l and a trailing pair of bolt-receiving apertures 178t defined therein. The apertures 176l, 176t, 178l, 178t defined in the mounting portion 174 define the two different longitudinal securement positions 156, 158 for the sub-frame 148. More particularly, the apertures 176l and 178l define the first longitudinal securement position 156, and the apertures 176t and 178t define the second longitudinal securement position 158. In some implementations, additional apertures are defined in the mounting portion 174 to provide additional longitudinal securement positions for the sub-frame 148.

In the present implementation, the sub-frame 148 is removably secured to the frame 128 in the first longitudinal securement position 156, by aligning the leading pair of apertures 178l with the apertures 170, 172 and the leading pair of apertures 176l with the apertures 166, 168. Then, a bolt is inserted into each of the apertures 166, 168, 170, 172 and through a corresponding one of the apertures 176l, 178l. Then, a nut is threaded and suitably tightened on each of the bolts. This secures the sub-frame 148 in the first longitudinal securement position 156.

Similarly, the sub-frame 148 is removably secured to the frame 128 in the second longitudinal securement position 158, by aligning the trailing pair of apertures 178t with the apertures 170, 172 and the trailing pair of apertures 176t with the apertures 166, 168, then by inserting a bolt into each of the apertures 166, 168, 170, 172 and through a corresponding one of the apertures 176t, 178t, and then by threading and suitably tightening a nut onto each of the bolts to secure the sub-frame 148 in the second longitudinal securement position 158.

In the present implementation, the apertures 176*l*, 178*l*, 176*t*, 178*t* are circular. In some implementations, one or more of the apertures 176*l*, 178*l*, 176*t*, 178*t* have different shape(s). Also, in some implementations, the frame 128 has a different number of apertures 176*l*, 178*l*, 176*t*, 178*t* defined therein. For example, in some implementations, and as shown in FIG. 11, the mounting portion 174 has two apertures 180, 182 defined therein in place of the apertures 176*l*, 176*t* and two apertures 184, 186 defined therein in place of the apertures 178*l*, 178*t*.

As shown, the apertures 180, 182, 184, 186 are elongate and define a range of different longitudinal securement positions for the sub-frame 148, shown schematically with reference arrow 188 in FIG. 11. More particularly, the apertures 180, 182, 184, 186 are slots that define the range 188 of different longitudinal securement positions for the sub-frame 148. In some such implementations, the longitudinal securement position 156 is a position that is closest to the leading idler wheels 132*w* in the range 188, and the longitudinal securement position 158 is a position that is closest to the trailing idler wheels 134*w* in the range 188.

In some such implementations, the sub-frame 148 is secured to the frame 128 by bolts received through the apertures 166, 168, 170, 172 and corresponding ones of the slots 180, 182, 184, 186, each of the bolts having a nut threaded thereon and tightened to secure the sub-frame 148 to the frame 128 in a given longitudinal securement position. In some such implementations, to change the given longitudinal securement position of the sub-frame 148, the nuts securing the sub-frame 148 are loosened, then the sub-frame 148 is repositioned into a different longitudinal securement position by sliding the sub-frame 148 forward or rearward along the mounting portion 174, and then the sub-frame 148 is re-secured to the frame 128, and more particularly to the mounting portion 174 in this implementation, in the different longitudinal securement position by re-tightening the nuts.

It is contemplated that the nuts could be removed for repositioning the sub-frame 148. The nuts and bolts are an example of a securement mechanism. It is contemplated that a different suitable securement mechanism could be used. For example, it is contemplated that the securement mechanism could have a single bolt to removably secure the sub-frame 148 in any one of the different longitudinal securement positions.

Figure 17:
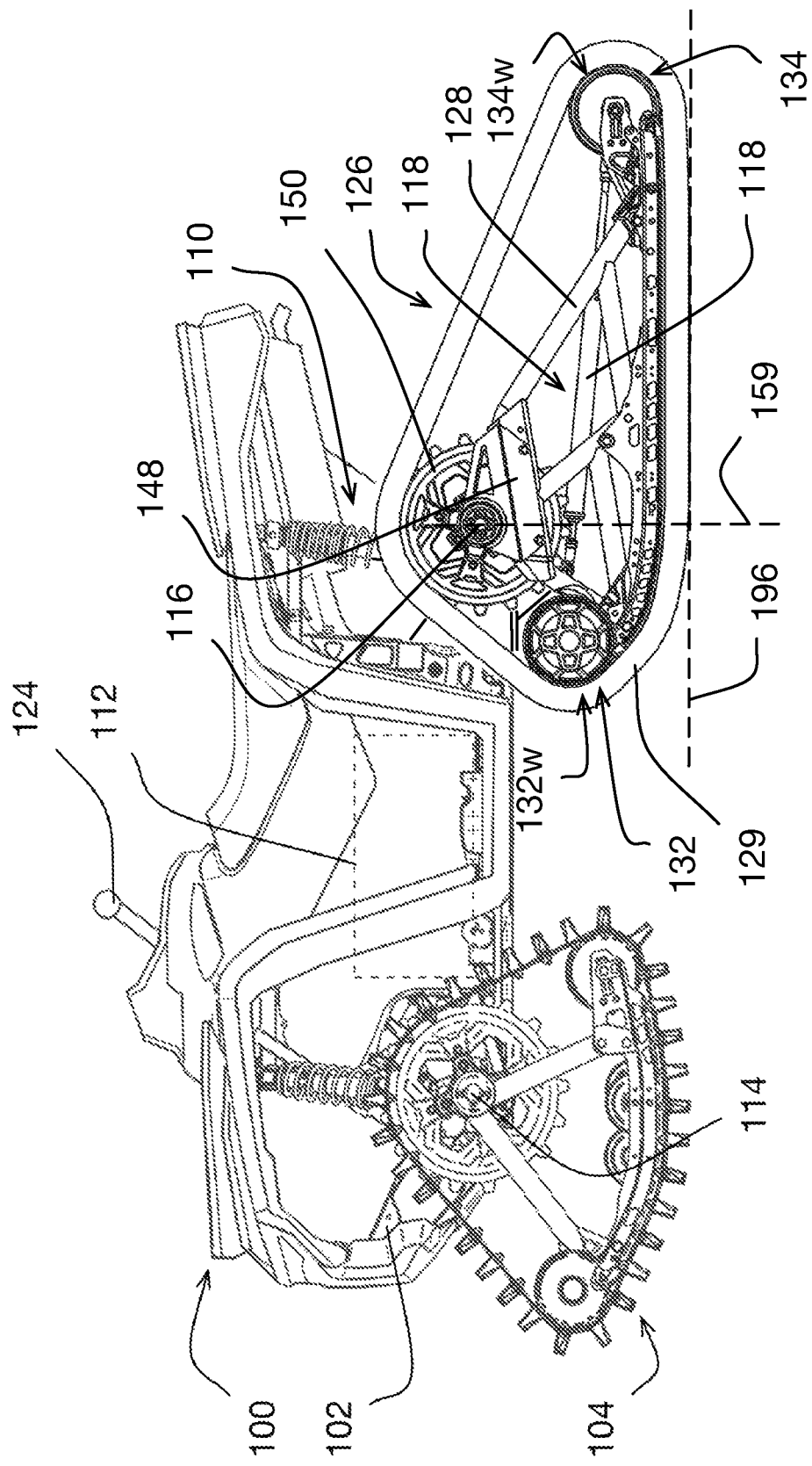
FIG. 17 is a left side elevation view of the all-terrain vehicle of FIG. 1, with the rear left track assembly having been replaced with the rear left track assembly of FIG. 3, with the mid-rollers of the rear left track assembly removed.

Referring to FIG. 17, the different longitudinal securement positions 156, 158 for the sub-frame 148 on the frame 128 (and also the different longitudinal securement positions 156, 158 for the sub-frame 149 on the frame 128, as will become evident from the description herein below), allow a user of the track assembly 126 to selectively change a ratio between: a) a longitudinal horizontal distance of contact between the endless track 129 of the track assembly 126 and horizontal flat level ground 196 (shown schematically in FIG. 7) in front of a vertical reference plane 159 passing through an axis of rotation of the drive axle 116 to which the frame 128 of the track assembly 126 is connected, and b) a longitudinal horizontal distance of contact between the endless track 129 and the horizontal flat level ground 196 behind the vertical reference plane 159. In some applications, changing this ratio provides improved performance of the track assembly 126. In some applications, changing this ratio allows a relatively smaller rotation limiting device or the dynamic traction device 118 to be used with the track assembly 126. This ratio will further herein be referred to as the "forward-to-rearward ground contact ratio".

In some applications, the different longitudinal securement positions 156, 158 of the sub-frame 148 on the frame 128 (and also the different longitudinal securement positions 156, 158 for the sub-frame 149 on the frame 128, as will become evident from the description herein below) allow for the track assembly 126 to fit a relatively larger number of different vehicles. For example, a given vehicle may have relatively large clearances between its rear left wheel (not shown) and the parts of its chassis and other components (not shown) that surround the rear left wheel of the given vehicle. The clearances may be large enough for a given implementation and size of the track assembly 106 to be installed on that vehicle instead of the rear left wheel of that vehicle.

However, in another vehicle, the clearances may be too small to permit the given implementation and size of that track assembly 106 to be installed on that vehicle. On the other hand, in some cases, a given implementation of the track assembly 126 that is equal in size to the size of the given implementation of the track assembly 106 may fit a vehicle having the relatively smaller clearances when the sub-frame 148 of the track assembly 126 is removably secured in one but not in the other one of the longitudinal securement positions 156, 158. That is, in some cases, a particular one but not the other one(s) of the longitudinal securement positions 156, 158 may provide for an overall geometry of the track assembly 126 that would allow for the track assembly 126 to fit a particular vehicle. Accordingly, additional longitudinal securement positions for the sub-frame 148 provide additional flexibility in some applications.

Drive Wheel Positioning

Referring back to FIG. 7, in the present implementation of the track assembly 126, the longitudinal securement positions 156, 158 are distributed on the frame 128, and in the present implementation therefore also on the mounting portion 174, along a drive wheel positioning plane 190. The drive wheel positioning plane 190 has an angle 192 relative to a reference plane 194, the reference plane 194 being positioned parallel to the drive wheel axis 152 and normal to horizontal flat level ground 196 when the track assembly 126 is in use on the flat level ground 196.

In the present implementation, the angle 192 is defined such that the track length 154 is a given track length when the sub-frame 148 is removably secured to the frame 128 in any one of the two different longitudinal securement positions 156, 158. In other words, when the sub-frame 148 is removably secured to the frame 128 in the longitudinal securement position 156, the track length 154 is equal to the track length 154 when the sub-frame 148 is removably secured to the frame 128 in the longitudinal securement position 158. In one aspect, this allows for a given endless track 129 to be used with the track assembly 126 irrespective of whether the sub-frame 148 is removably secured to the frame 128 in the longitudinal securement position 156 or the longitudinal securement position 158.

In some implementations, the angle 192 is defined such that the track length 154 when the sub-frame 148 is in the first longitudinal securement position 156 is different from the track length 154 when the sub-frame 148 is in the second longitudinal securement position 158. The difference could be selected (by selecting the angle 192 for example) such that it could be compensated for, either partially or completely, by adjusting the at least one tensioner assembly 131 after a change of the longitudinal securement position of the sub-frame 148. In some applications, this allows for a given endless track 129 to be used with the track assembly 126 irrespective of whether the sub-frame 148 is removably secured to the frame 128 in the longitudinal securement position 156 or the longitudinal securement position 158. In one particular implementation, the angle 192 is defined such that the difference in the track length 154 that results from using the first longitudinal securement position 156 of the sub-frame 148 instead of the second longitudinal securement position 158 of the sub-frame 148, or vice-versa, is 0.1 inches (2.54 millimeters) or less. In that particular implementation, the tensioner assembly 131 is adjusted when the longitudinal securement position of the sub-frame 148 is changed and thereby allows for one and the same endless track 129 to be used with the track assembly 126 before and after the change of the longitudinal securement position of the sub-frame 148.

It is contemplated that the sub-frame 148 and the frame 128 could be structured to provide other magnitudes of differences in the track length 154 that could result from changing the longitudinal securement position of the sub-frame 148 on the frame 128 of the track assembly 126. It is contemplated that at least some such other magnitudes of differences in the track length 154 could allow for a given endless track 129 to be used with the track assembly 126 irrespective of whether the sub-frame 148 is removably secured to the frame 128 in the longitudinal securement position 156 or the longitudinal securement position 158, depending on each particular implementation of the tensioner assembly 131, or other tensioner assembly used with the track assembly 126, for example. As one example, it is contemplated that the angle 192 could be defined such that the track length 154 changes by 0.2 inches (5.08 millimeters) or less when the longitudinal securement position of the sub-frame 148 is changed from one of the longitudinal securement position 156 and the longitudinal securement position 158 to the other one of the longitudinal securement position 156 and the longitudinal securement position 158.

It is contemplated that in implementations in which the sub-frame 148 is removably securable in three or more different longitudinal securement positions, the angle 192 could be defined such that when the sub-frame 148 is removably secured to the frame 128 in any one of the three or more different longitudinal securement positions, the track length 154 would be within a range of magnitudes that would allow, in combination with corresponding adjustments of the at least one tensioner assembly 131 or other tensioner assembly, for a given endless track 129 to be used with the track assembly 126 irrespective of the particular longitudinal securement position of the sub-frame 148. This range of track length magnitudes is further referred to as an "acceptable range of track length magnitudes".

In some implementations, the two or more longitudinal securement positions 156, 158 for the sub-frame 148 are distributed on the frame 128 along a curve 198. In some such implementations, the curve 198 is shaped such that the track length 154 is a given track length, or within the acceptable range of track length magnitudes, when the sub-frame 148 is removably secured to the frame 128 in at least two different longitudinal securement positions 156, 158 on the curve 198. In some such implementations, the curve 198 is provided by the flange 162 and 178 being curved in the shape of the curve 198. It is contemplated that other constructions could be used to provide for the curve 198.

Interchangeable Sub-Frames

In another aspect, in the present implementation, the sub-frame 148 of the rear left track assembly 126 (FIG. 3) is interchangeable with the sub-frame 149 of the rear right track assembly 127 (FIG. 4).

That is, in the present implementation, each of the sub-frames 148, 149 is removably securable to the frame 200 of the rear right track assembly 127 in any one of the two longitudinal securement positions on the frame 200, instead of the other one of the sub-frames 148, 149, by being removably secured to the mounting portion 202 (FIG. 4) of the rear right track assembly 127. Similarly, each of the sub-frames 148, 149 is removably securable to the frame 128 of the rear left track assembly 126 in any one of the two longitudinal securement positions 156, 158 on the frame 128, instead of the other one of the sub-frames 148, 149, by being removably secured to the mounting portion 174 of the rear left track assembly 126.

Figure 13:
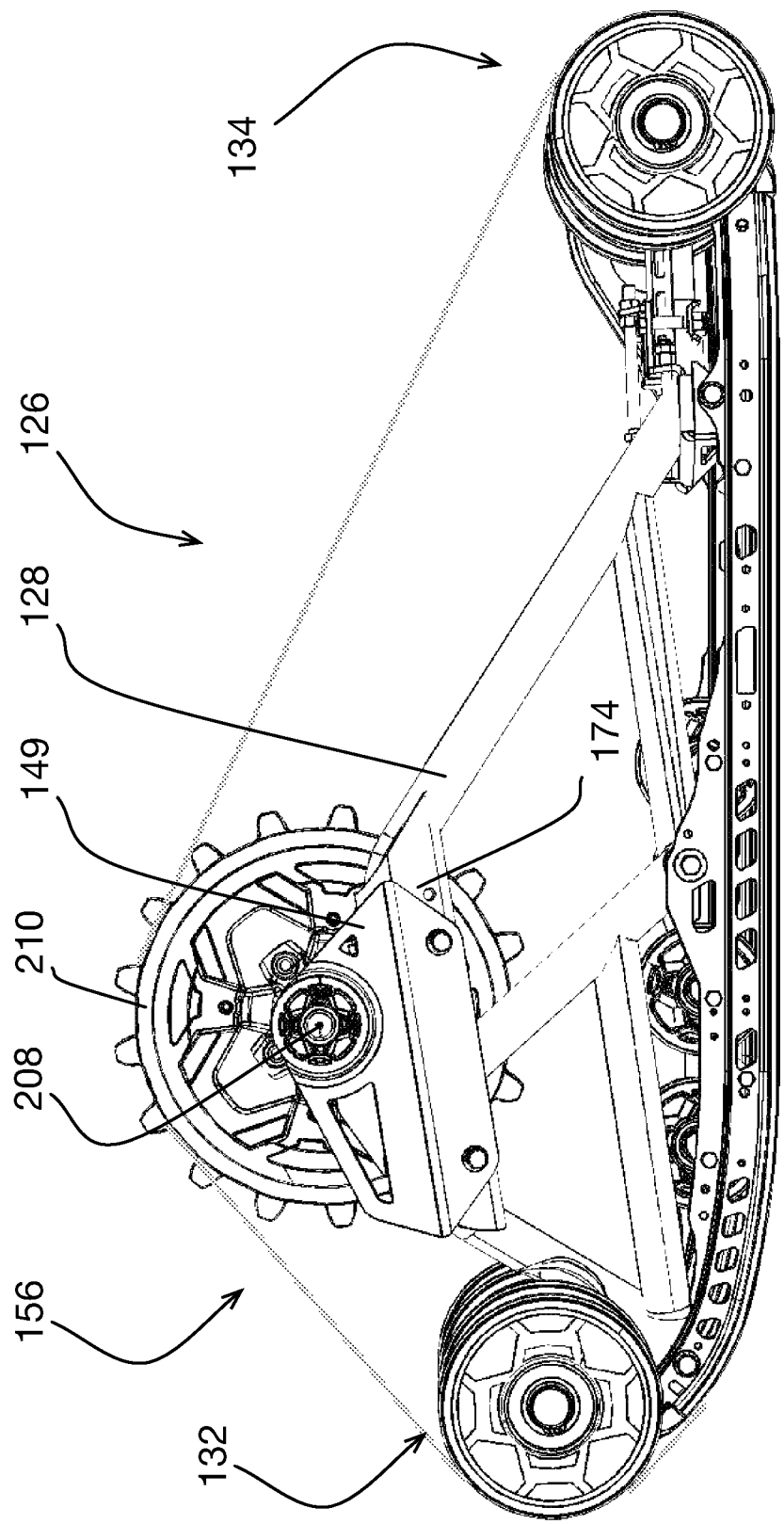
FIG. 13 is a left side elevation view of the rear left track assembly of FIG. 8, with a sub-frame of the rear right track assembly of FIG. 4 being removably secured to the frame of the rear left track assembly in the first longitudinal securement position of the rear left track assembly.
Figure 14:
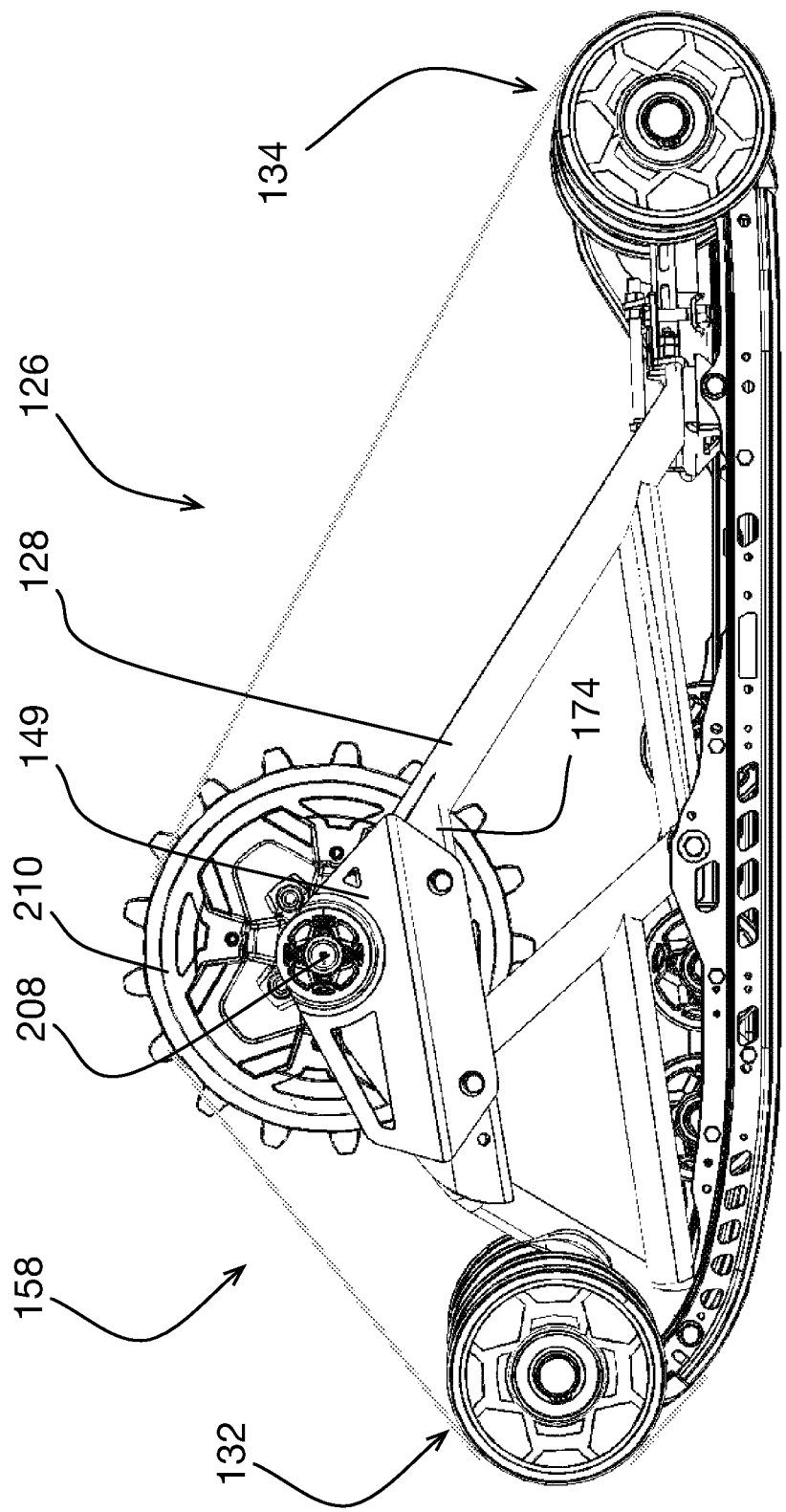
FIG. 14 is a left side elevation view of the rear left track assembly of FIG. 13, with the sub-frame of the rear right track assembly of FIG. 4 being removably secured to the frame of the rear left track assembly in the second longitudinal securement position of the rear left track assembly.
Figure 15:
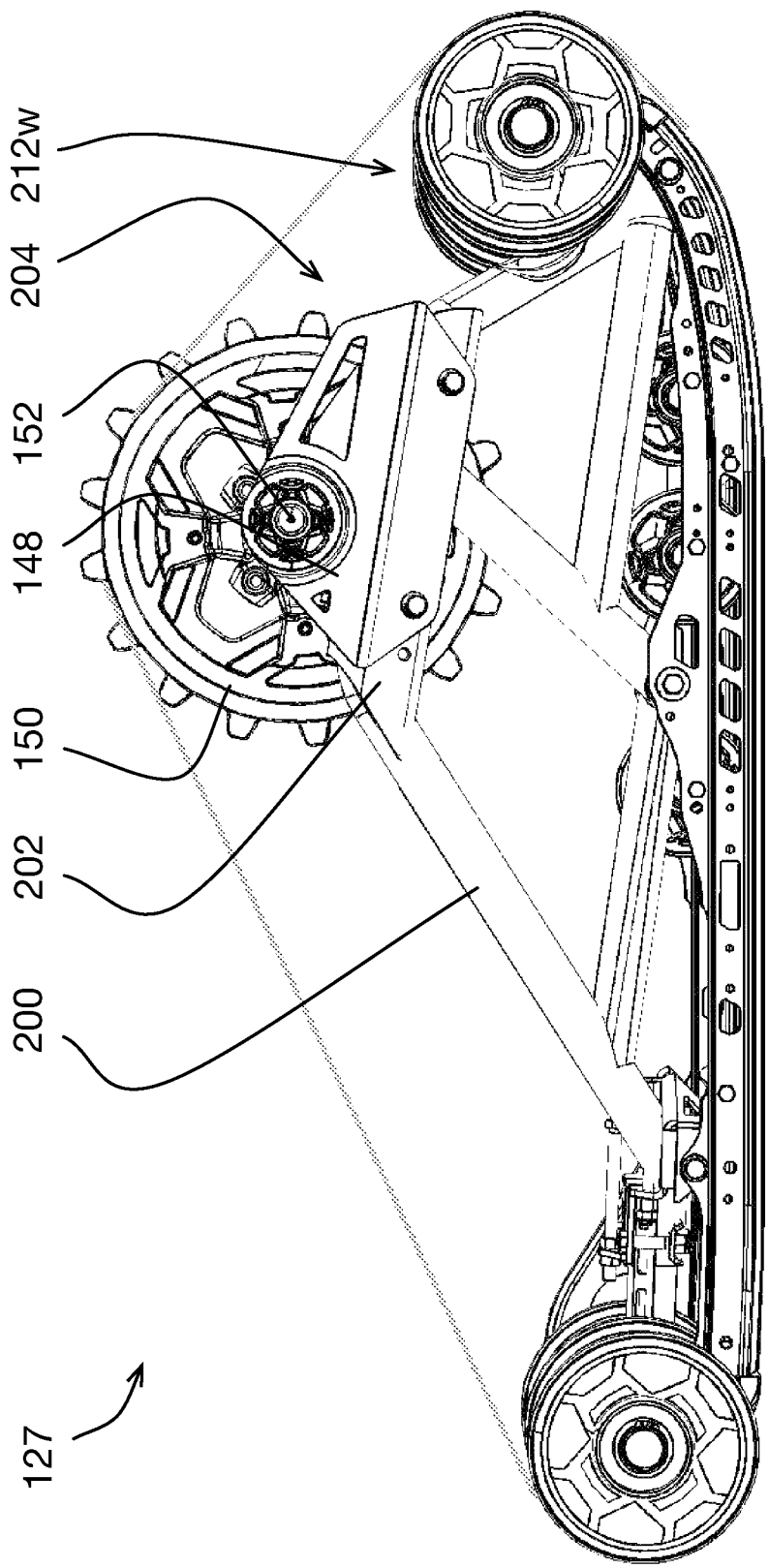
FIG. 15 is a right side elevation view of the rear right track assembly of FIG. 4, with the sub-frame of the rear left track assembly of FIG. 3 being removably secured to the frame of the rear right track assembly in the first longitudinal securement position of the rear right track assembly.
Figure 16:
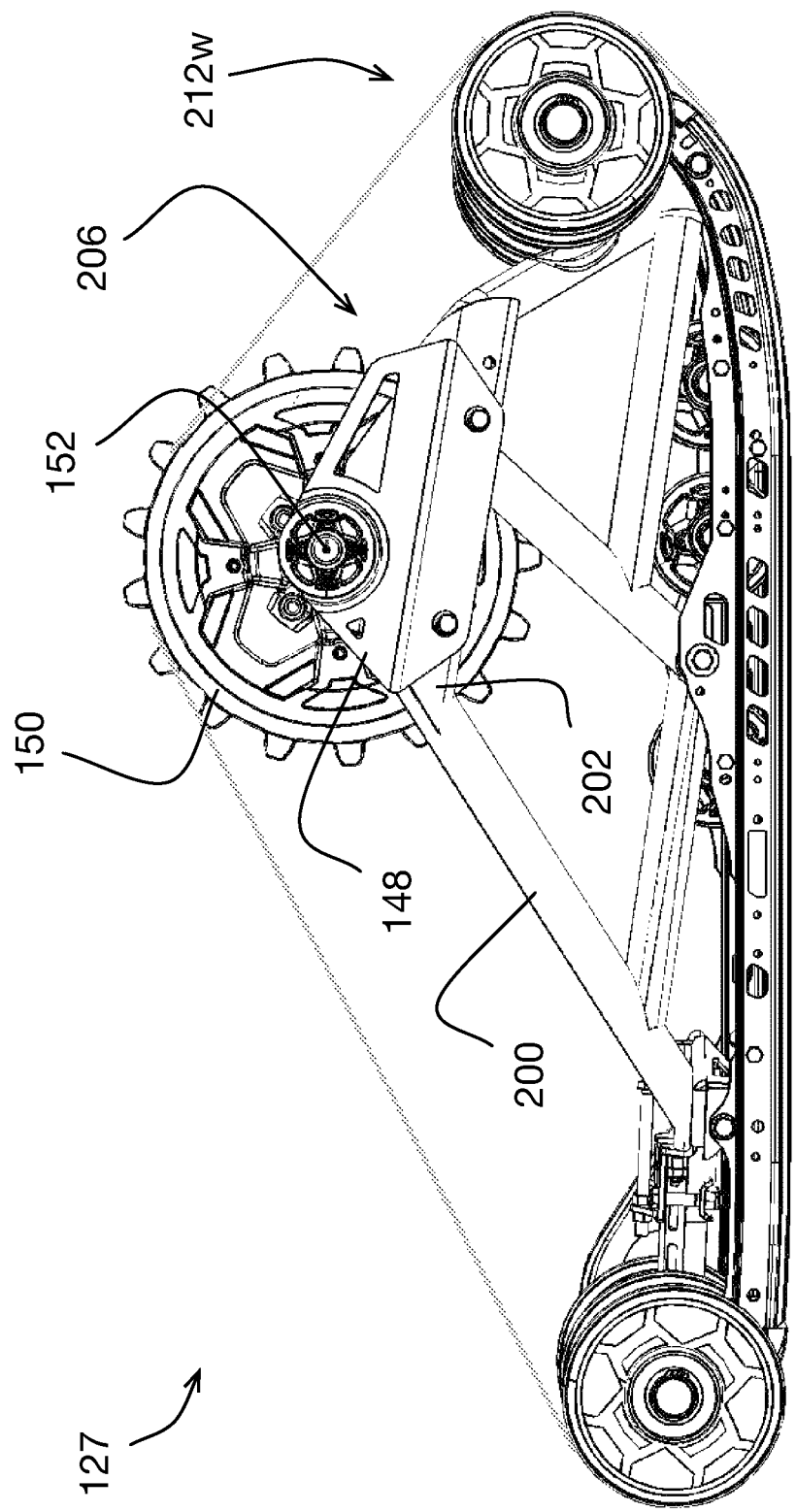
FIG. 16 is a right side elevation view of the rear right track assembly of FIG. 4, with the sub-frame of the rear left track assembly of FIG. 3 being removably secured to the frame of the rear right track assembly in the second longitudinal securement position of the rear right track assembly.

FIG. 13 shows the sub-frame 149 of the rear right track assembly 127 being removably secured to the frame 128 of the rear left track assembly 126, via mounting portion 174, in the first longitudinal securement position 156 on the frame 128. FIG. 14 shows the sub-frame 149 of the rear right track assembly 127 being removably secured to the frame 128 of the rear left track assembly 126, via mounting portion 174, in the second longitudinal securement position 158 on the frame 128. FIG. 15 shows the sub-frame 148 of the rear left track assembly 126 being removably secured to the frame 200 of the rear right track assembly 127, via mounting portion 202, in the first longitudinal securement position 204 on the frame 200. FIG. 16 shows the sub-frame 148 of the rear left track assembly 126 being removably secured to the frame 200 of the rear right track assembly 127, via mounting portion 202, in the second longitudinal securement position 206 on the frame 200.

As shown in FIGS. 7 and 8 for example, the drive wheel axis 152 of the sub-frame 148 is positioned longitudinally asymmetrical in the sub-frame 148. As shown in FIGS. 13 and 14 for example, the drive wheel axis 208 of the sub-frame 149 is positioned longitudinally asymmetrical in the sub-frame 149.

Thus, as shown by FIGS. 7, 8, and 13 to 16, the drive wheel 150 of the first track assembly 126 is in a different longitudinal position relative to the leading idler wheels 212w of the rear right track assembly 127 when the sub-frame 148 of the rear left track assembly 126 is removably secured to one of the longitudinal securement positions 204, 206 on the frame 200 of the rear right track assembly 127 than a longitudinal position of the drive wheel 210 of the rear right track assembly 127 relative to the leading idler wheels 212w of the rear right track assembly 127 when the sub-frame 149 of the rear right track assembly 127 is removably secured to the one of the longitudinal securement positions 204, 206 on the frame 200 of the rear right track assembly 127.

In one aspect, the interchangeability of the sub-frames 148, 149 in combination with the two different longitudinal securement positions 156, 158, 204, 206 on the sub-frames 148, 149 on each of the frames 128, 200 provides the rear left track assembly 126 with a total of four possible different longitudinal positions of drive wheel in which the rear left track assembly 126 could have a drive wheel. Two of the four different longitudinal positions of drive wheel are provided by the drive wheel 150, and the other two of the four different longitudinal positions of drive wheel are provided by the drive wheel 210.

Similarly, the interchangeability of the sub-frames 148, 149 in combination with the two different longitudinal securement positions 156, 158, 204, 206 of drive wheel on the sub-frames 148, 149 on each of the frames 128, 200 provides the rear right track assembly 127 with four possible different longitudinal positions in which the rear right track assembly 127 could have a drive wheel.

The interchangeability of the sub-frames 148, 149 is described in more detail with reference to FIGS. 17 and 18. FIG. 17 shows the rear left track assembly 126 being mounted onto the rear left drive axle 116 of the ATV 100 and being connected to the chassis 102 of the ATV 100 via the dynamic traction device 118. FIG. 18 shows the rear right track assembly 127 being mounted onto the rear right drive axle 117 of the ATV 100 and being connected to the chassis 102 of the ATV 100 via the dynamic traction device 119. As shown, the sub-frame 148 of the rear left track assembly 126 is on the rear left track assembly 126 in a given longitudinal position, and the sub-frame 149 of the rear right track assembly 127 is on rear right track assembly 127 in a given longitudinal position.

In the present implementation, the sub-frame 148 can be secured on the rear left track assembly 126 in one other longitudinal position, as described herein above, which would reposition the drive wheel 150 relative to the frame 128 in a different longitudinal position. Similarly, the sub-frame 149 can be secured on the rear right track assembly 127 in one other longitudinal position, as described above, which would reposition the drive wheel 210 relative to the frame 200 in a different longitudinal position. Further, in the present implementation, the sub-frame 148 can be interchanged with the sub-frame 149, as described herein above. The sub-frame 148 can then be secured in one of the two different longitudinal positions on the frame 200 and thereby provide two additional different longitudinal positions of drive wheel on the rear right track assembly 127, and the sub-frame 149 can then be secured in one of the two different longitudinal positions on the frame 128 and thereby provide two additional different longitudinal positions of drive wheel on the rear left track assembly 126.

In implementations of the track assemblies 126, 127 in which the sub-frame 148, 149 of each of the track assemblies 126, 127 is removably securable in more than two different longitudinal securement positions on the frame of each of the track assemblies 126, 127, interchangeability of the sub-frames 148, 149 provides for a number of possible different longitudinal positions in which each of the track assemblies 126, 127 could have a drive wheel, which number is double the number of the different longitudinal securement positions in which each of the sub-frames 148, 149 is securable on each of the frames 128, 200.

In some implementations, the sub-frames 148, 149 of the track assemblies 126, 127 are interchangeable, but each have only one securement position on each of the frames 128, 200 of the track assemblies 126, 127. In such implementations, the rear left track assembly 126 has two possible different longitudinal positions in which the rear left track assembly 126 could have a drive wheel, and the rear right track assembly 127 has two possible different longitudinal positions in which the rear right track assembly 127 could have a drive wheel. These different longitudinal positions of drive wheel are obtained by interchanging the sub-frames 148, 149.

In some cases, interchangeability of the sub-frames 148, 149 allows for a given implementation of the rear track assemblies 126, 127 to fit a relatively larger number of different vehicles. In some cases, interchangeability of the sub-frames 148, 149 allows for a given implementation of a corresponding pair of the rear track assemblies 126, 127 to provide for a relatively larger number of different possible locations of the center of gravity of each of the pair of the track assemblies 126, 127. In some cases, adjusting the forward-to-rearward ground contact ratio of each of the pair of the track assemblies 126, 127 allows to use relatively smaller rotation limiting or dynamic traction devices.

In some implementations of the track assembly 126, the drive wheel 150, and therefore also the drive wheel axis 152 of the sub-frame 148 is positioned longitudinally symmetrical in the sub-frame 148, as shown schematically in FIG. 8 with reference circle 214. In some such implementations, the different longitudinal securement positions 156, 158 are used to provide drive wheel longitudinal position adjustment as described herein above. In such (symmetrical) implementations, interchanging the sub-frames 148, 149 does not provide for additional drive wheel longitudinal position adjustment. In some implementations of the track assemblies 126, 127, and irrespective of whether the sub-frames 148, 149 of those track assemblies 126, 127 are symmetric or asymmetric, the sub-frames 148, 149 of the track assemblies 126, 127 are not interchangeable.

Manufacturing and Materials

It is contemplated that new vehicles, such as the ATV 100, could be manufactured with the track assemblies 126, 127. It is contemplated an existing vehicle could be retrofitted by, for example, replacing the rear wheels of the existing vehicle with corresponding ones of the track assemblies 126, 127.

The present technology has been illustrated in the example implementations described herein with respect to its use in rear track assemblies 126, 127. In other implementations, the present technology is used in front track assemblies, which front track assemblies could replace the front wheels or other front ground-engaging elements of a vehicle. For example, the present technology could be implemented in the front left track assembly 104 and the front right track assembly of the ATV 100.

It is contemplated that the track assemblies 126, 127 could be made of any suitable conventionally known combination of materials and manufacturing method(s). It is contemplated that the track assemblies 126, 127 could be manufactured, assembled, or sold without an endless track 129. It is contemplated that the track assemblies 126, 127 could be manufactured, assembled, or sold without an endless track 129 being mounted on the track assemblies 126, 127.

Modifications and improvements to the above-described implementations of the present technology may become apparent to those skilled in the art. The foregoing description is intended to be exemplary rather than limiting.

The invention claimed is:

1. A track assembly to be mounted on a rotatable drive axle of a vehicle, comprising:
   a frame having a front, a rear, a bottom, a left side, and a right side;
   a leading idler wheel assembly including at least one leading idler wheel mounted to the front of the frame for rotation about a transverse leading idler wheel axis;
   a trailing idler wheel assembly including at least one trailing idler wheel mounted to the rear of the frame for rotation about a traverse trailing idler wheel axis parallel to the leading idler wheel axis; and
   a single drive wheel assembly including,
      a sub-frame removably securable to the frame in any one of a plurality of longitudinal securement positions on the frame, wherein the frame, when secured to the sub-frame, is non-mobile relative to the sub-frame; and
      a drive wheel rotationally mounted on the sub-frame for rotation about a drive wheel axis and operatively connectable to the drive axle of the vehicle, the drive wheel axis being parallel to the leading idler wheel axis and the trailing idler wheel axis, the drive wheel being in different longitudinal positions relative to the at least one leading idler wheel and the at least one trailing idler wheel when the sub-frame is removably secured to different ones of the longitudinal securement positions;

the drive wheel, the at least one leading idler wheel, and the at least one trailing idler wheel being positioned relative to the frame to support an endless track around the drive wheel, the at least one leading idler wheel, and the at least one trailing idler wheel, the drive wheel, the at least one leading idler wheel, and the at least one trailing idler wheel together defining a track length of the endless track;

wherein:
the plurality of the longitudinal securement positions is distributed on the frame along a drive wheel positioning plane; a reference plane is positioned parallel to the drive wheel axis and normal to horizontal flat level ground when the track assembly is in use on the flat level ground; the drive wheel positioning plane has an angle relative to the reference plane; and the angle is defined such that the track length is a given track length when the sub-frame is removably secured to the frame in at least two different longitudinal securement positions of the plurality of longitudinal securement positions; and wherein the angle relative to the reference plane is greater than 90 and remains constant when the sub-frame is removably secured to the frame in the at least two different longitudinal securement positions of the plurality of longitudinal securement positions.

2. The track assembly of claim 1, wherein the sub-frame is selectively securable to the frame in any one of the plurality of longitudinal securement positions by being fastened to the frame with a fastener received through the sub-frame in an aperture defined in the frame.

3. The track assembly of claim 1, further comprising a tensioner assembly operable to adjust the track length, and wherein the plurality of the longitudinal securement positions are positioned relative to each other on the frame such that:
the track length is a first track length when the sub-frame is removably secured to the frame in a first longitudinal securement position of the plurality of longitudinal securement positions;
the track length is a second track length when the sub-frame is removably secured to the frame in a second longitudinal securement position of the plurality of longitudinal securement positions, the second longitudinal securement position being different from the first longitudinal securement position, the second track length being different from the first track length; and
the tensioner assembly is operable to adjust the second track length while the sub-frame is in the second longitudinal securement position to make the second track length equal to the first track length.

4. The track assembly of claim 3, wherein the tensioner assembly operatively connects at least one of the leading idler wheel assembly and the trailing idler wheel assembly to the frame.

5. The track assembly of claim 3, wherein the plurality of the longitudinal securement positions are positioned relative to each other on the frame such that the second track length is within a range of:
the first track length minus 0.2 inches; and
the first track length plus 0.2 inches.

6. The track assembly of claim 3, wherein the plurality of the longitudinal securement positions are positioned relative to each other on the frame such that the second track length is within a range of:
the first track length minus 0.1 inches; and
the first track length plus 0.1 inches.

7. The track assembly of claim 1, wherein:
the plurality of the longitudinal securement positions is distributed on the frame along a curve; and
the curve is shaped such that the track length is a given track length when the sub-frame is removably secured to the frame in at least two different longitudinal securement positions of the plurality of longitudinal securement positions on the curve.

8. The track assembly of claim 7, wherein:
the at least two different longitudinal securement positions are two different longitudinal securement positions;
the plurality of longitudinal securement positions includes more than the two different longitudinal securement positions; and
the rest of the plurality of longitudinal securement positions is positioned between the two different longitudinal securement positions.

9. The track assembly of claim 1, wherein:
the track assembly includes a slot in the frame;
the plurality of longitudinal securement positions is defined by the slot; and
the sub-frame is removably securable in any one of the plurality of longitudinal securement positions by being fastened to the frame with at least one fastener received through the sub-frame and the slot.

10. The track assembly of claim 9, wherein the drive wheel axis is positioned longitudinally asymmetrical in the sub-frame.

11. The track assembly of claim 1, wherein the frame of the track assembly includes a longitudinally-extending left slide rail at the bottom of the frame, and a longitudinally-extending right slide rail at the bottom of the frame.

12. The track assembly of claim 11, further comprising a mid-roller mounted for rotation at the bottom of the frame, the mid-roller extending downward past a bottom surface of each of the left slide rail and the right slide rail and rolling on an interior side of the endless track when the endless track is supported around the drive wheel, the at least one leading idler wheel, and the at least one trailing idler wheel, and the track assembly is driven on horizontal flat level ground.

13. The track assembly of claim 1, wherein the at least one trailing idler wheel is three trailing idler wheels mounted to the rear of the frame for rotation about the trailing idler wheel axis.

14. The track assembly of claim 1, wherein the at least one trailing idler wheel is two trailing idler wheels mounted to the rear of the frame for rotation about the trailing idler wheel axis.

15. A pair of track assemblies to be mounted on the rotatable drive axle of the vehicle, the pair of track assemblies comprising:
a first track assembly of claim 1 mountable on a left side of the vehicle, the sub-frame of the first track assembly being removably securable to the frame of the second track assembly in any one of the plurality of longitudinal securement positions on the frame of the second track assembly; and
a second track assembly of claim 1 mountable to a right side of the vehicle, the sub-frame of the second track assembly being removably securable to the frame of the first track assembly in any one of the plurality of longitudinal securement positions on the frame of the first track assembly;

the drive wheel of first track assembly being in a different longitudinal position relative to the at least one leading idler wheel of the second track assembly when the sub-frame of the first track assembly is removably secured to one of the longitudinal securement positions on the frame of the second track assembly than a longitudinal position of the drive wheel of the second track assembly relative to the at least one leading idler wheel of the second track assembly when the sub-frame of the second track assembly is removably secured to the one of the longitudinal securement positions on the frame of the second track assembly.

16. A vehicle having the pair of track assemblies of claim 15, the pair of track assemblies being mounted to rear drive axles of the vehicle.

17. The vehicle of claim 16, wherein the vehicle is one of: an all-terrain vehicle, a side-by-side vehicle and a motorized wheelchair.

\* \* \* \* \*